(12) United States Patent
Dawson et al.

(10) Patent No.: US 10,900,531 B2
(45) Date of Patent: Jan. 26, 2021

(54) SPRING WIRE ENDS TO FACILIATE WELDING

(71) Applicant: Bal Seal Engineering, LLC, Foothill Ranch, CA (US)

(72) Inventors: Richard Dawson, Orange, CA (US); Tobias Schelbert, Bern (CH)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 22 days.

(21) Appl. No.: 16/118,075

(22) Filed: Aug. 30, 2018

(65) Prior Publication Data

US 2019/0063537 A1 Feb. 28, 2019

Related U.S. Application Data

(60) Provisional application No. 62/552,274, filed on Aug. 30, 2017.

(51) Int. Cl.
| | |
|---|---|
| *F16F 1/12* | (2006.01) |
| *F16F 1/04* | (2006.01) |
| *F16B 21/20* | (2006.01) |
| *F16J 15/10* | (2006.01) |
| *F16L 37/22* | (2006.01) |

(Continued)

(52) U.S. Cl.
CPC .............. *F16F 1/123* (2013.01); *B21F 35/00* (2013.01); *F16B 21/205* (2013.01); *F16F 1/04* (2013.01); *F16F 1/042* (2013.01); *F16F 1/045* (2013.01); *F16J 15/104* (2013.01); *F16L 37/22* (2013.01); *F16F 2226/048* (2013.01); *F16J 2015/0856* (2013.01); *H01R 13/187* (2013.01)

(58) Field of Classification Search
CPC .. F16F 1/122; F16F 1/123; F16F 1/125; F16F 1/04; F16F 1/045; F16F 1/042; F16J 15/0887; F16J 15/0893; F16J 15/104; F16J 2015/0856; F16L 37/22; B21F 35/00; B21F 35/02
USPC ......................................... 267/166, 167, 180
See application file for complete search history.

(56) References Cited

U.S. PATENT DOCUMENTS

| | | | |
|---|---|---|---|
| 3,174,500 A | | 3/1965 | Johnson et al. |
| 3,250,331 A | * | 5/1966 | Boyle ...................... E21B 23/02 166/133 |

(Continued)

FOREIGN PATENT DOCUMENTS

| | | |
|---|---|---|
| CH | 706277 A1 | 9/2013 |
| DE | 19807663 | 9/1999 |

(Continued)

OTHER PUBLICATIONS

Extended European Search Report from the European Patent Office on co-pending EP application (EP18191601.6) dated Feb. 14, 2019.

*Primary Examiner* — Thomas J Williams
(74) *Attorney, Agent, or Firm* — Klein, O'Neill & Singh, LLP

(57) ABSTRACT

Spring rings and closed wire loops each can have two ends that are connected. The connected ends can be welded. The connected ends can be aligned for welding by incorporating complementary surfaces so that when joined, the tip at the first end mate to the tip at the second end. The mating can be self-aligning spatially and radially. The spring rings and the closed wire loops can be used in many applications, including in connector applications and seal applications.

20 Claims, 12 Drawing Sheets

(51) Int. Cl.
  B21F 35/00 (2006.01)
  H01R 13/187 (2006.01)
  F16J 15/08 (2006.01)

(56) References Cited

U.S. PATENT DOCUMENTS

| | | |
|---|---|---|
| 3,359,617 A | 12/1967 | Baumler |
| 3,468,527 A * | 9/1969 | Mather ................ F16F 1/045 |
| | | 267/167 |
| 4,122,326 A * | 10/1978 | Mercier ................ B23K 11/04 |
| | | 219/104 |
| 4,655,462 A | 4/1987 | Balsells |
| 4,655,945 A | 4/1987 | Balsells |
| 4,678,210 A | 7/1987 | Balsells |
| 4,804,290 A | 2/1989 | Balsells |
| 4,805,943 A | 2/1989 | Balsells |
| 4,826,144 A | 5/1989 | Balsells |
| 4,830,344 A | 5/1989 | Balsells |
| 4,872,710 A | 10/1989 | Konecny et al. |
| 4,876,781 A | 10/1989 | Balsells |
| 4,893,795 A | 1/1990 | Balsells |
| 4,907,788 A | 3/1990 | Balsells |
| 4,915,366 A | 4/1990 | Balsells |
| 4,934,666 A | 6/1990 | Balsells |
| 4,961,253 A | 10/1990 | Balsells |
| 4,964,204 A | 10/1990 | Balsells |
| 4,974,821 A | 12/1990 | Balsells |
| 5,072,070 A | 12/1991 | Balsells |
| 5,079,388 A | 1/1992 | Balsells |
| 5,091,606 A | 2/1992 | Balsells |
| 5,108,078 A | 4/1992 | Balsells |
| 5,117,066 A | 5/1992 | Balsells |
| 5,134,244 A | 7/1992 | Balsells |
| 5,139,243 A | 8/1992 | Balsells |
| 5,139,276 A | 8/1992 | Balsells |
| 5,149,642 A | 9/1992 | Mazur et al. |
| 5,160,122 A | 11/1992 | Balsells |
| 5,161,806 A | 11/1992 | Balsells |
| 5,203,849 A | 4/1993 | Balsells |
| 5,239,737 A | 8/1993 | Balsells |
| 5,265,890 A | 11/1993 | Balsells |
| 5,358,224 A | 10/1994 | Balsells |
| 5,411,348 A | 5/1995 | Balsells |
| 5,474,309 A | 12/1995 | Balsells |
| 5,503,375 A | 4/1996 | Balsells |
| 5,545,842 A | 8/1996 | Balsells |
| 5,570,719 A | 11/1996 | Richards et al. |
| 5,575,487 A | 11/1996 | Balsells |
| 5,599,027 A | 2/1997 | Balsells |
| 5,709,371 A | 1/1998 | Balsells |
| 5,791,638 A | 8/1998 | Balsells |
| 5,979,904 A | 11/1999 | Balsells |
| 5,984,316 A | 11/1999 | Balsells |
| 5,992,856 A | 11/1999 | Basells et al. |
| 6,050,572 A | 4/2000 | Balsells et al. |
| 6,060,682 A * | 5/2000 | Westbroek ............ B23K 26/24 |
| | | 219/121.64 |
| 6,161,838 A | 12/2000 | Balsells |
| 6,264,205 B1 | 7/2001 | Balsells |
| 6,641,141 B2 | 11/2003 | Schroeder |
| 6,672,565 B2 | 1/2004 | Russell |
| 6,835,084 B2 | 12/2004 | Poon et al. |
| 7,055,812 B2 | 6/2006 | Balsells |
| 7,210,398 B2 | 5/2007 | Balsells |
| 7,464,750 B2 | 12/2008 | Schapel et al. |
| 7,538,289 B2 | 5/2009 | Carroll |
| 7,722,415 B2 | 5/2010 | Changsrivong |
| 7,914,315 B2 | 3/2011 | Kuhn et al. |
| 7,914,351 B2 | 3/2011 | Balsells et al. |
| 7,985,105 B2 | 7/2011 | Balsells |
| 8,052,459 B2 | 11/2011 | Smith et al. |
| 8,096,559 B2 | 1/2012 | Cook |
| 8,096,842 B2 | 1/2012 | Poon et al. |
| 8,308,167 B2 | 11/2012 | Balsells et al. |
| 8,328,202 B2 | 12/2012 | Foster et al. |
| 8,336,864 B2 | 12/2012 | Noh |
| 8,382,532 B2 | 2/2013 | Sjostedt et al. |
| 8,491,346 B2 | 7/2013 | Sjostedt et al. |
| 8,544,850 B2 | 10/2013 | Balsells et al. |
| 8,561,274 B2 | 10/2013 | Balsells |
| 8,590,867 B2 | 11/2013 | Leon |
| 8,684,362 B2 | 4/2014 | Balsells et al. |
| 9,004,805 B2 | 4/2015 | Changsrivong et al. |
| 9,121,507 B2 * | 9/2015 | Ghalambor .......... F16J 15/3212 |
| 9,194,497 B2 | 11/2015 | Rastegar |
| 9,234,591 B2 | 1/2016 | Dilmaghanian et al. |
| 9,267,526 B2 | 2/2016 | Balsells |
| 9,273,742 B2 | 3/2016 | Balsells et al. |
| 9,284,970 B2 | 3/2016 | Dilmaghanian et al. |
| 9,285,034 B2 | 3/2016 | Balsells et al. |
| 9,312,630 B2 | 4/2016 | Huang |
| 9,357,684 B2 | 5/2016 | Foster |
| 9,482,255 B2 | 11/2016 | Changsrivong et al. |
| 9,500,211 B2 | 11/2016 | Changsrivong |
| 9,518,626 B2 | 12/2016 | Balsells et al. |
| 9,534,625 B2 | 1/2017 | Balsells |
| 9,677,587 B2 | 6/2017 | Changsrivong et al. |
| 2002/0122690 A1 | 9/2002 | Poon et al. |
| 2003/0096526 A1 | 5/2003 | Balsells |
| 2004/0239053 A1 * | 12/2004 | Rowe ................ F16J 15/0887 |
| | | 277/650 |
| 2006/0228166 A1 | 10/2006 | Balsells |
| 2010/0237565 A1 | 9/2010 | Foster |
| 2010/0279558 A1 | 11/2010 | Leon et al. |
| 2010/0289198 A1 | 11/2010 | Balsells et al. |
| 2010/0301567 A1 * | 12/2010 | Schmitt ................ F16J 15/0887 |
| | | 277/654 |
| 2011/0006486 A1 | 1/2011 | Niknezhad |
| 2013/0043661 A1 | 2/2013 | Binder et al. |
| 2013/0149031 A1 | 6/2013 | Changsrivong et al. |
| 2014/0130329 A1 | 5/2014 | Changsrivong et al. |
| 2014/0162487 A1 | 6/2014 | Frederick et al. |
| 2014/0259617 A1 | 9/2014 | Kompa et al. |
| 2014/0312570 A1 | 10/2014 | Foster |
| 2014/0378008 A1 | 12/2014 | Young et al. |
| 2015/0240900 A1 | 8/2015 | Poon et al. |
| 2015/0316115 A1 | 11/2015 | Carter |
| 2016/0047473 A1 | 2/2016 | Foster et al. |
| 2016/0076568 A1 | 3/2016 | Dilmaghanian et al. |
| 2016/0204557 A1 | 7/2016 | Kim |
| 2016/0223086 A1 | 8/2016 | Balsells et al. |
| 2016/0265574 A1 | 9/2016 | Ghasiri |
| 2017/0025779 A1 | 1/2017 | Dilmaghanian et al. |
| 2017/0172018 A1 | 6/2017 | Dilmaghanian et al. |
| 2017/0261108 A1 | 9/2017 | Soler et al. |
| 2017/0328474 A1 | 11/2017 | Balsells |
| 2017/0352984 A1 | 12/2017 | Changsrivong et al. |
| 2017/0373425 A1 | 12/2017 | Rust |
| 2018/0112778 A1 | 4/2018 | Dilmaghanian et al. |
| 2018/0119857 A1 | 5/2018 | Balsells |
| 2019/0170254 A1 * | 6/2019 | Taslakian ................ F16J 9/14 |

FOREIGN PATENT DOCUMENTS

| | | | |
|---|---|---|---|
| EP | 2333372 A2 | 6/2011 | |
| GB | 2194298 | 3/1988 | |
| JP | 58188597 A * | 11/1983 | ............ B23K 33/00 |
| WO | WO 03067713 | 8/2003 | |

* cited by examiner

FIG. 4A     FIG. 4B     FIG. 4C
 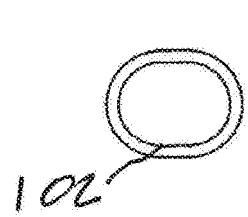 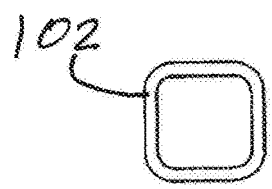
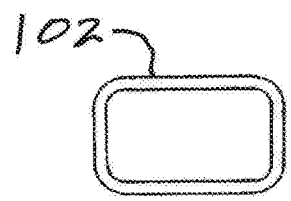 
FIG. 4D     FIG. 4E
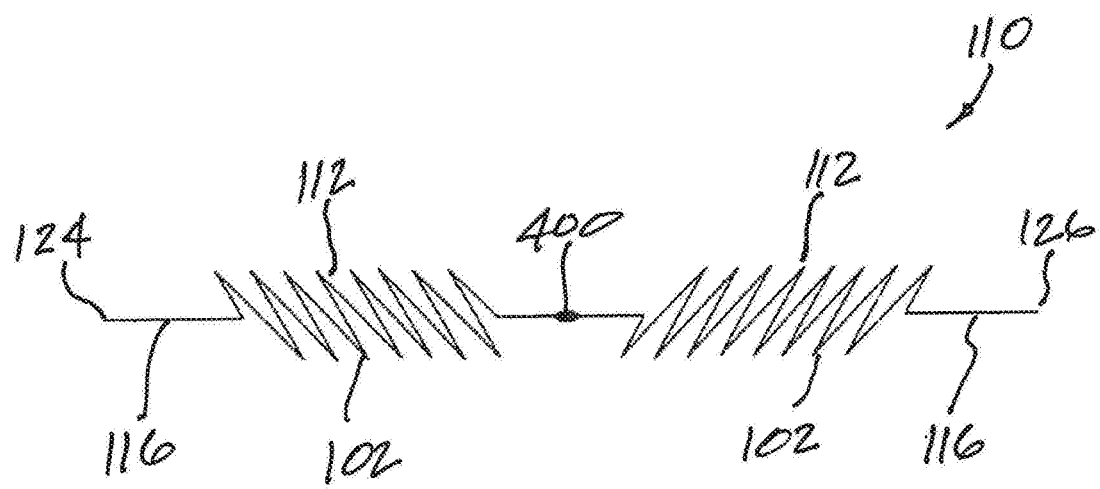
FIG. 5

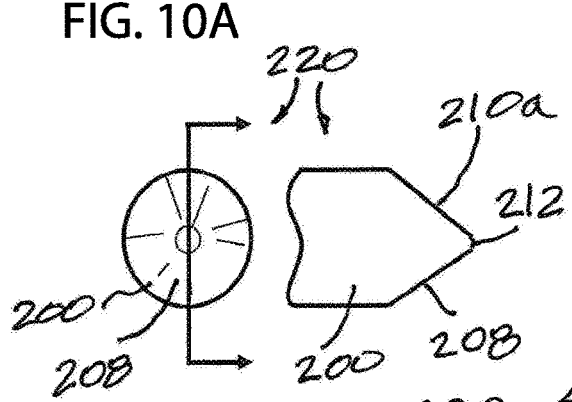
FIG. 10A
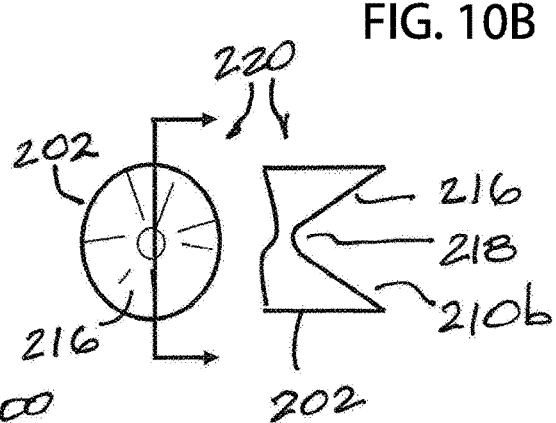
FIG. 10B
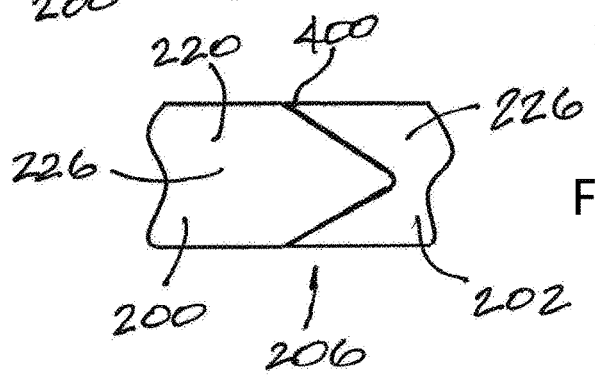
FIG. 10C
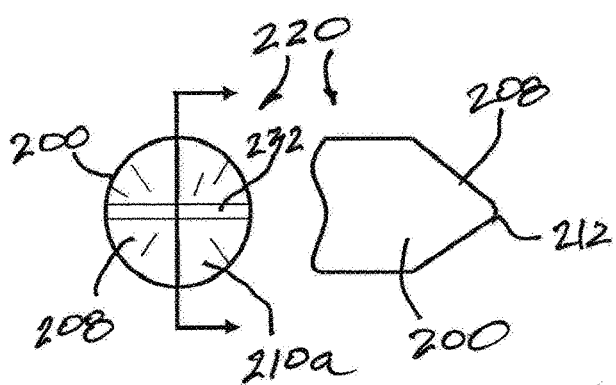
FIG. 11A
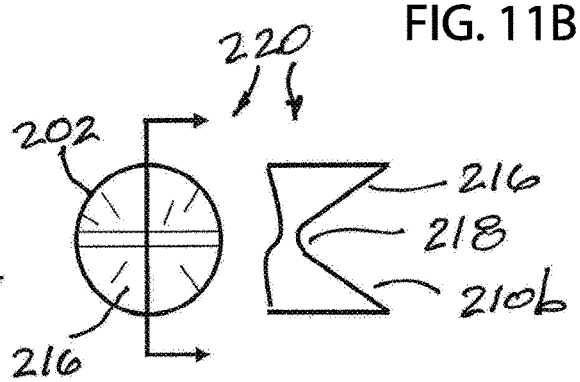
FIG. 11B
FIG. 11C FIG. 12A
FIG. 12B
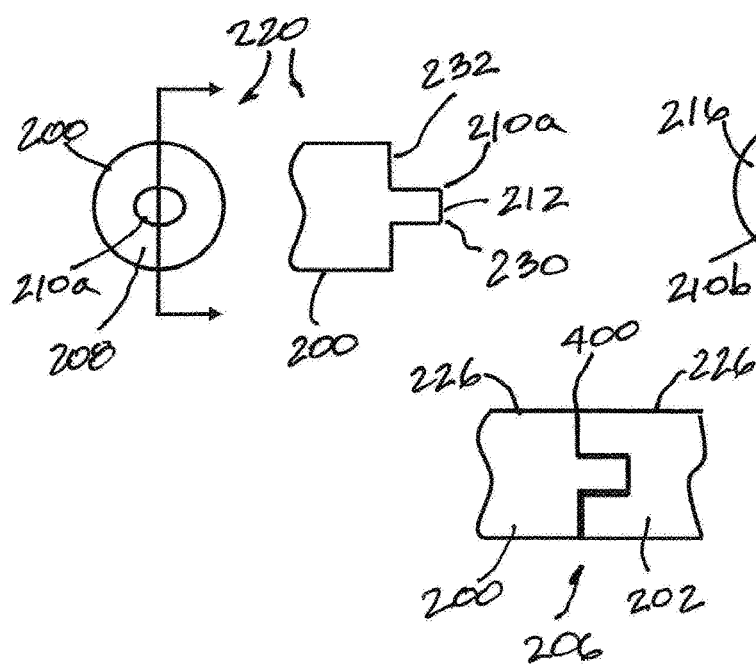
FIG. 12C
FIG. 13A
FIG. 13B
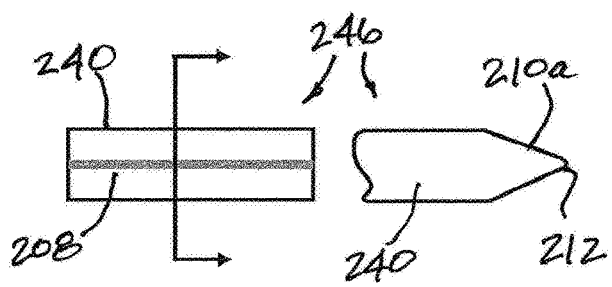
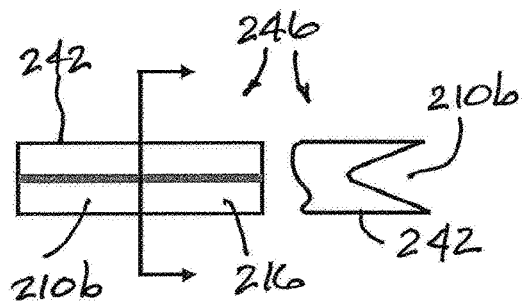
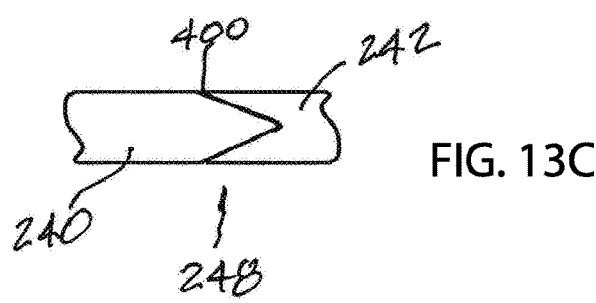
FIG. 13C FIG. 14A
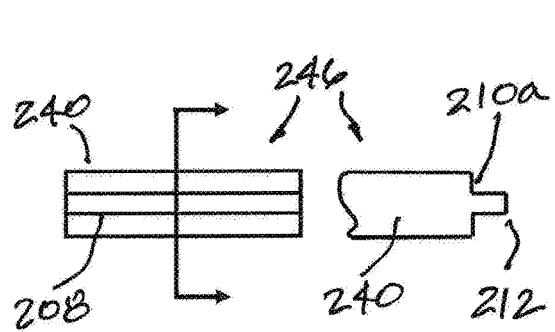
FIG. 14B
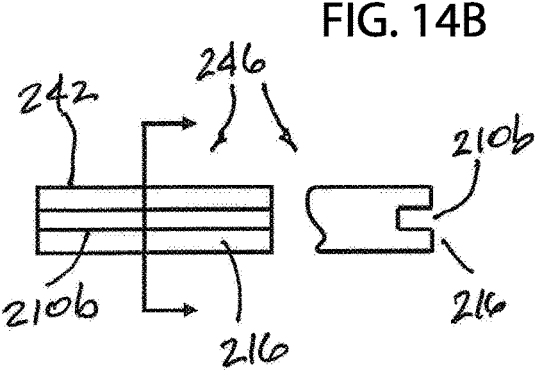
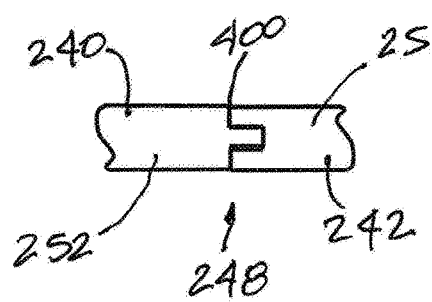
FIG. 14C
FIG. 15A
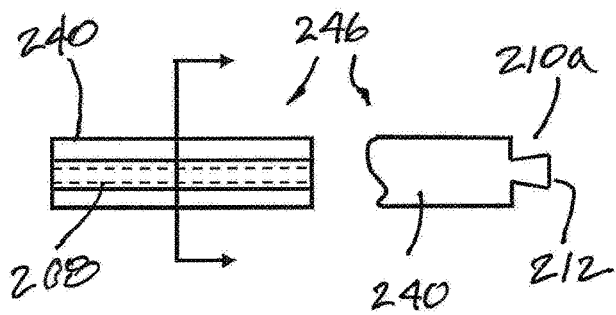
FIG. 15B
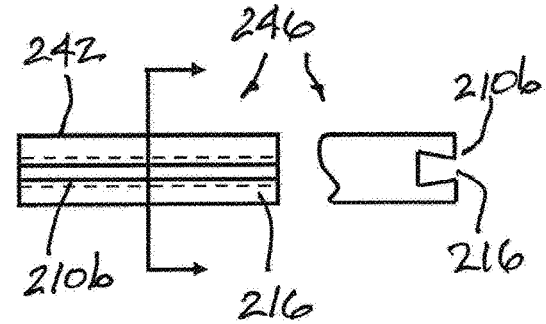
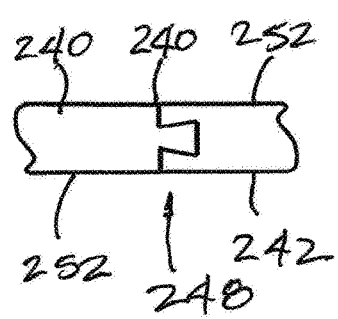
FIG. 15C

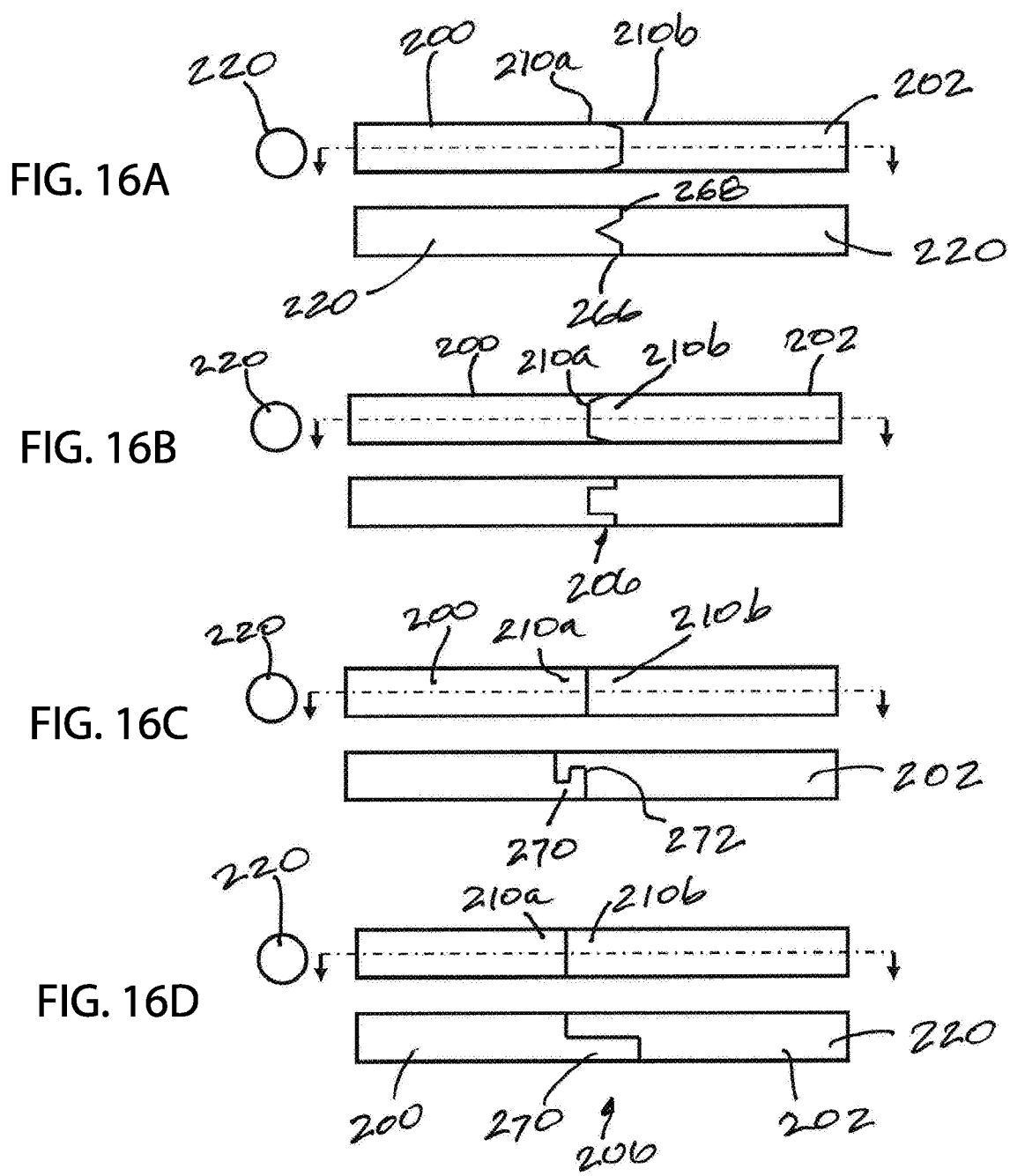

SPRING WIRE ENDS TO FACILIATE WELDING

FIELD OF ART

The present disclosure is generally related to springs with specific discussions on spring contoured ends that facilitate alignment for welding purposes, applications of the springs, and related methods.

BACKGROUND

Metal springs come in many types and sizes and can include ribbon springs, V-springs, canted coil springs, leaf springs, and canted coil springs. Springs are often used for their springing or resilient characteristics, such as to push or pull to surfaces together or away from one another, and can be used in a spring length configuration or in a spring ring configuration, also known as a garter spring. For example, a spring length can have two ends attached together to form a spring ring or a garter spring and be used in a connector application or a seal application, to bias two seal flanges away from one another, as an example.

When welding two ends of a spring length together to form a spring ring, having the two ends of the wire aligned to enable welding them together is important to having a good weld. For many, a good weld is simply a weld that holds the ends together for the spring's intended use. Generally, the two ends are cut and held in close proximity either by the hands or by a gripping tool, such as by spring loaded alligator clips, and then the ends are welded, such as with a soldering iron, laser, arc welding, etc.

SUMMARY

When welding two ends of a spring length together to form a spring ring, when welding two ends of a wire together to form a closed loop or a ring, or when welding two ends of a strip together to form a ring, such as garter shaped ribbon spring, having two ends of the wire or strip aligned to enable welding them together is important to having a good weld.

Various wire lengths for forming canted coil spring rings (and compressing spring rings) and metal strips for forming ribbon spring rings can benefit by the complementary surfaces for end parts disclosed herein. The end parts can align to facilitate good welds. Aspects of the present disclosure include two ends provided with alignment features for self-alignment. Aspects of the present disclosure also include methods for shaping two ends of a wire or a strip to include alignment features for self-alignment.

The wires for forming canted coil springs and helical springs and the strips for forming V-springs and ribbon springs to be welded into a shape, such as a ring, have ends that can self-align during the welding process. In an example, the two ends are provided with a first part and a second part. The first part and the second part can be complementary, such as having surface features that are complementary. The first part and the second part can have mating features, such as mating surfaces. The first part can be located on a first end of a wire or a strip and the second part can be located on a second end of the wire or the strip.

Aspects of the present disclosure include a metallic spring ring comprising: a spring length having a spring body with a plurality of interconnected coils or interconnected V-bodies and a first end connected to a second end to form a closed loop, said second end being on an end of the spring body opposite the first end; wherein the first end comprises a first tip and the second end comprises a second tip, and wherein the first tip and the second tip have complementary surfaces for aligning the two ends along a first direction and along at least one radial direction relative to the first direction.

The first tip can comprise a male projection and the second tip can comprise a counterpart female receiving end.

The complementary surfaces at the ends of the metallic spring can comprise an abutting surface on the first tip contacting an abutting surface on the second tip for spatial alignment and/or a radial surface on the first tip contacting a radial surface on the second tip for radial alignment along at least one direction.

The complementary surfaces of the first tip and the second tip can be self-aligning, which is understood to mean complementary surfaces that push one another to settle to a particular position. In this case, when the surfaces of the two ends are brought together in an end-to-end configuration, the complementary surfaces force the two ends to align. The alignment facilitates welding in that the two ends are aligned spatially and/or radially in at least one radial direction. As further discussed below, the complementary surfaces described herein can provide one or the other or both.

The complementary surfaces can comprise at least one of a cone and a counterpart female receiving end, a flat tip and a counterpart female receiving end, a tongue and a groove, a dovetail and a counterpart female receiving end, an extended portion with a radial portion and an identical reverse counterpart, and an extended portion and an identical reverse counterpart.

The spring body can comprise a plurality of interconnected coils that cant generally in a same direction or helical coils.

The spring body can comprise a plurality of ribbon coils or a plurality of V-bodies.

The V-bodies can each comprise a first leg attached to a second leg at a connecting end.

The first end can be welded to the second end.

The complementary surfaces of the first end and the second end can be formed by photo etching.

A further aspect of the present invention is a connector assembly comprising: a housing having a bore; a pin located inside the bore of the housing; at least one groove formed with the housing inside the bore or on an exterior of the pin; a spring ring located in the at least one groove; wherein the spring ring comprising: a spring length having a spring body with a plurality of interconnected coils or interconnected V-bodies and a first end connected to a second end to form a closed loop, said second end being on an end of the spring body opposite the first end; wherein the first end comprises a first tip and the second end comprises a second tip, and wherein the first tip and the second tip have complementary surfaces for aligning the two ends along a first direction and along at least one radial direction relative to the first direction.

The connector assembly can further comprise a second groove, and wherein the spring ring can be captured between the at least one groove and the second groove.

The spring ring can be a radial canted coil spring or an axial canted coil spring.

The connector can be a locking connector, a latching connector with unlatching capability, or a holding connector.

The at least one groove and the second groove can have any number of shapes, widths, and depths. The grooves can be structured to abut the coils near the major axes of the coils for locking. The grooves can be structured to abut the coils near the minor axes of the coils for latching and unlatching.

The grooves can be narrower than the major axes of the coils or wider than the major axes of the coils of the radial canted coil spring.

When using an axial canted coil spring, the grooves can be narrower than the minor axes of the coils or wider than the minor axes of the coils of the canted coil spring.

A still further aspect of the present invention is a seal assembly comprising: a seal element having an inside flange defining a bore, an outside flange defining an outside diameter of the seal element, and a center channel section, said inside and outside flanges and said center channel section defining a spring groove; and a spring ring located in the spring groove, said spring ring comprising: a spring length having a spring body with a plurality of interconnected coils or interconnected V-bodies and a first end connected to a second end to form a closed loop, said second end being on an end of the spring body opposite the first end; wherein the first end comprises a first tip and the second end comprises a second tip, and wherein the first tip and the second tip have complementary surfaces for aligning the two ends along a first direction and along at least one radial direction relative to the first direction.

The seal assembly can further comprise a support ring engaged to the center channel section or a locking ring having a flange extending into the spring groove.

A canted coil spring provided herein can comprise a spring body with a plurality of inter-connected coils in a spring ring configuration with a ring center. The ring center defines an axis passing through the ring, which can alternatively be called a ring axis.

Each coil of the plurality of coils of the canted coil spring can be oriented so that the minor axis of the coil, or the shorter of two axes of the elliptical shaped coil, is aligned to be generally parallel to the ring axis and the major axis, or the longer of the two axes, is generally perpendicular to the ring axis.

A common axis passes through the center of each coil may be referred to as a coil axis, which is perpendicular to the ring axis. The coils can all cant generally the same direction, which gives the spring its canting characteristics.

As a canted coil spring typically deflects when a force is applied along the minor axes of the coils, the coils will deflect in a direction parallel to the ring axis. Thus, the canted coil spring may be referred to as an axial canted coil spring since an axial force parallel to the ring axis will cause the coils to deflect along their minor axes, for an axial canted coil spring.

As further discussed below, a spring length having a spring body with a plurality of interconnected coils with two free ends each with contoured surfaces and the two having complementary surfaces can be welded with a weld joint to form a spring ring, such as the axial canted coil spring.

Each coil of a plurality of canted coils can be oriented so that the minor axis of the coil, or the shorter of two axes of the elliptical shaped coil, is aligned to be generally orthogonal or perpendicular to the ring axis and the major axis, or the longer of the two axes, is generally parallel to the ring axis.

As a canted coil spring typically deflects when a force is applied along the minor axes of the coils, the coils shown and described herein will deflect in a direction perpendicular or radial to the ring axis. Thus, the canted coil spring may be referred to as a radial canted coil spring since a radial force perpendicular to the ring axis will cause the coils to deflect along their minor axes. A common axis passes through the center of each coil and may be referred to as a coil axis, which is perpendicular to the ring axis.

A spring length having a spring body with a plurality of interconnected coils with two free ends each with contoured surfaces and the two having complementary surfaces can be welded with a weld joint to form a spring ring, such as the radial canted coil spring.

When a canted coil spring is located in a groove and the major axes or the minor axes of the coils are rotated 45 degrees, for example, the coils can be restrained within the groove of a housing, a pin, or a seal element at a rotated position, the axial canted coil spring and the radial canted coil spring can be expected to act the same and provide the same deflection or biasing response, all else being equal.

For a canted coil spring, the further the deflecting force moves away from the end points of a minor axis of a coil, the higher is the force required to deflect the coil since part of the force is re-directed in the axial direction as the applied force moves away from the end points of the minor axis. When the deflecting force is directed generally at the end points of a major axis, the coils will not defect without destroying or causing the coils to buckle since the coils do not deflect along their major axes.

A turned angle canted coil spring can be coiled to take on an angle or rotation when two ends of a spring length are joined without having to first place the canted coil spring into a groove. The canted coil spring with rotated coils may be referred to as a free standing turned angle canted coil spring. In other words, the coils can turn when in free standing, outside of a groove.

When a radial canted coil spring or an axial canted coil spring is located in a groove that has been sized and dimensioned to turn the coils within the groove, the coils can operate as a turned angle.

While typical canted coil springs have coils that are generally elliptical in shape, canted coil springs with coils that are non-elliptical can also be used with contoured ends of the present invention.

Canted coil springs with coils that are non-elliptical as shown in U.S. Publication No. 2017/0025779 and in U.S. Publication No. 2017/0261108 can also be used with contoured ends of the present invention. The contents of these documents are expressly incorporated herein by reference.

Non-canted coil springs, such as a ribbon spring or a V-spring, can also practice the contoured ends with complementary surfaces to facilitate alignment of the present invention. A helical spring comprising spring body with a plurality of inter-connected coils in a spring ring configuration with a ring center are also described. The ring center can define an axis passing through the ring, which can alternatively be called a ring axis. For a helical spring, each coil is orientated with the front and back curves that resemble a saw tooth, which differs from the canted coils of a canted coil spring. The coils of the present helical spring do not compress when a radial force is applied to the coils, unlike canted coil springs. Instead, helical springs can only stretch, also called gartering, or compress.

When in a spring ring configuration, a helical spring can expand like a rubber-band or compress until the adjacent coils are butted. The helical spring ring can be formed by taking a length of standard extension or compression spring and attaching the two ends together using shaped ends with complementary surfaces as described herein.

A ribbon spring comprising a spring length with a spring body having a plurality of interconnected coils is described. The ribbon spring is similar to a helical spring but formed by coiling a metal ribbon instead of a metal wire. The ribbon spring can be formed in a long length and then cut to size to form a particular spring ring size.

Each coil of a ribbon spring is a revolution of the ribbon in a helical pattern. Thus, a length of ribbon spring can have a spring body with a plurality of interconnected ribbon coils. Each coil can be coiled to a range of sizes and the ribbon can have different dimensions and material properties to form a ribbing spring of desired springing characteristics. Two free ends of a ribbon spring length can be joined, such as with a weld joint, to from a ribbon spring ring. The free ends can have contoured shapes and complementary surfaces as further described herein below to facilitate welding them together to form a spring ring.

Two different wire ends of a metal wire section to be joined end-to-end to form a spring ring. For example, the two ends can be two ends of the spring ring. The metal wire section can represent a wire length for forming a wire loop or a spring section or length having a spring body with a plurality of interconnected coils for forming a spring ring. Thus, the two ends can be ends of a wire or ends of a spring length. The metal wire section can have any number of sizes or gauges for use in a spring ring application.

The two ends have contoured shapes with complementary surfaces, such as a male projection and a counterpart female receiving end, to facilitate spatial and/or radial alignments when placed together to form a mated end set to then form a weld joint to permanently secure them together.

The two wire ends can be identified as a first end or first part and a second end or second part. The wire ends can be the two free ends of a section of a wire or two free ends of a section of a spring length with a spring body having a plurality of interconnected coils. Foreseeably, the two free ends can also be different ends of two different lengths and then the ends are joined to form a single length of a wire or a single length of a spring.

The end surface of the first end can have a first tip, which can be a male part or male projection and can have a pointed tip or a conical shape tip, similar to a pencil tip, and wherein the tip most point of the conical shape can be somewhat rounded or can be pointed.

The first tip can have a sloped surface, conical in circumference, that terminates at the tip most point. When viewing the cross-sectional view, the first tip can resemble an inverted V-shape.

A second end or second part of the same metal wire section can have a counterpart shape. The end surface of the second end can have a second tip and the second tip can be a reversed conical shape receiving end or a counterpart female receiving end of the conical shape tip, and wherein the bottom most point can be somewhat rounded or can be pointed and can be sized to receive the tip most part of the first tip. The second tip can have a sloped surface that bottoms out or terminates at a bottom most point. When viewing the cross-sectional view, the second tip can resemble a V-shape.

The first end and the second end of the metal wire section can be brought together end-to-end to form a mated end set. The first tip of the first end and the second tip of the second end can be complementary with alignment features. That is, by utilizing a male tip with a complementary female tip that receives the male tip, the two ends of the metal wire section can be self-aligning or have self-alignment features when joined together to form a mated end set.

The mated end set can have two ends that are in spatial alignment and/or radial alignment. That is, the complementary shapes, when brought together, can cause an abutting surface on the first tip, which can be the tip most point of the sloped conical surface, to contact an abutting surface on the second tip, such as the bottom most point or the female conical surface, for spatial alignment.

The closed circumference of the counterpart female receiving end of the second end can cause a radial surface on the first tip to contact a radial surface on the second tip for radial alignment along at least one direction. The two ends can be prevented from moving radially of the length due to the mated complementary surfaces. Consequently, the complementary surfaces of the two ends provide contact between the end surface of the first end and the end surface of the second end, or other surfaces at the two tips, to ensure spatial alignment and the female shape of the second tip of the of the second end receives the first tip of the first end and aligning the first end to the second end along the radial direction so that exterior surfaces at the two ends are aligned and not offset to any noticeable amount.

After the mated end set is formed, the two ends can be welded to form a weld joint to permanently secure the ends together to then form a closed loop ring or a spring ring.

In an alternative example, the end surface of the first end has a first tip, which can be a male part or a male projection and can have a flat tip, similar to a flat tip of a screw driver, and wherein the tip most point of the flat tip can have an edge with a length. The first tip can have sloped surfaces on either side of the edge that terminates at the tip most point. When viewing the cross-sectional view, the first tip resembles an inverted V-shape.

An end surface of a second end to the end with the flat tip can a second tip and the second tip can be a reversed receiving end, a counterpart female receiving end, or a complementary female receiving end of the flat tip, and wherein the bottom most point can be a strip and can be sized to receive the edge of the first tip. When viewing the cross-sectional view, the second tip resembles a V-shape.

In another example, a first end or first part of a metal wire section has a first tip, which can be a stub, similar to a short cylinder, and wherein the tip most point of the first tip can have round planar surface. A planar surface at the base of the first tip can function as a shoulder.

An end surface of a second end can have a second tip and the second tip can be a reversed receiving end, a counterpart female receiving end, or a complementary female receiving end of the stub, and wherein the bottom most point can be a corresponding round planar surface and can be sized to match the end tip of the first tip. The second tip of the present embodiment can be described as a receiving bore.

In an alternative embodiment, the first end and the second end of the wire can be provided with a tongue and groove complementary tips. For example, instead of a stub, the first tip can have an edge and instead of a receiving bore, the second tip can have a channel and wherein the two ends can form a mated end set that resembles a tongue and groove engagement.

Two different strip ends of a metal strip or ribbon to be joined are described. The metal wire strip or ribbon can represent a strip length having a spring body with a plurality of interconnected coils and two ends that can be joined for forming a spring ring. Thus, the two ends can be ends of a ribbon length or a strip length. The two ends can have contoured shapes and complementary surfaces to facilitate spatial and/or radial alignments when placed together to form a mated end set to then weld on to form a weld joint to permanently secure them together.

The two ribbon ends can be identified as a first end or first part and a second end or second part of the same spring body. The ribbon ends can be the two free ends of a section of a ribbon, such as two ends of a ribbon spring length comprising a spring body with a plurality of ribbon coils or two ends of a spring body comprising a plurality of V-bodies, also referred to as a spring length.

Foreseeably, the two free ends can also be different ends of two different lengths of ribbons and then the ends are joined to form a single length of a ribbon or strip or a single length of a ribbon spring.

An end surface of a first end of a metal strip or ribbon can have a first tip, which can be a male part or projection that can have a flat tip, similar to flat tip screw driver, and wherein the tip most point of the flat tip can be somewhat rounded or can be flat. The first tip can have a sloped surface on either side of the flat tip that terminates at the tip most point, rather than a flat wall with a flat tip. When viewing the cross-sectional view, the first tip can resemble a V-shape.

A second end or second part of the same metal ribbon or strip can be a reversed receiving end or a counterpart female receiving end of the flat tip, and wherein the bottom most point can be somewhat rounded and can be sized to receive the tip most part of the first tip. The second tip can have a sloped surface that bottoms out or terminates at a bottom most point. When viewing the cross-sectional view, the second tip can resemble a V-shape.

The first tip of a first end and a second tip of a second end of a ribbon or a spring body can be complementary with alignment features to facilitate alignment and improved weld joint. That is, by utilizing a male tip with a complementary female tip or counterpart female receiving end that receives the male tip, the two ends of the metal strip or ribbon can be self-aligning or have self-alignment features when joined together to form a mated end set.

The mated end set can have two ends that are in spatial alignment and/or radial alignment. That is, the complementary shapes provide contact between the end surface of the first end and the end surface of the second end to ensure spatial alignment and the female shape of the second tip of the of the second end receives the first tip of the first end and aligning the first end to the second end along the radial direction so that exterior surfaces at the two ends are aligned and not offset to any noticeable amount. After the mated end set is formed, the two ends can be welded to form a weld joint to permanently secure the two ends together to form a ribbon spring ring or a V-spring ring.

An end surface of a first end can have a first tip, which can be a male part or male projection and can have a flange with a linear length, similar to a tongue in a tongue and groove arrangement, and wherein the tip most point or end of the flange can be rounded or can be flat. The first tip can have parallel sidewalls on either side of the tip most point.

An end surface of a second end can have a second tip and the second tip can be a reversed receiving end or a counterpart female receiving end of the flange of the first part, which can be referred to as a channel. The bottom most point of the second tip can be rounded or flat and can be sized to receive the tip most end of the first tip. The channel of the second tip can have parallel sidewalls and can terminate at a bottom most point.

The first tip of the first end and the second tip of the second end can have complementary surfaces with alignment features. The complementary surfaces of the two ends of the present embodiment are often referred to as a tongue and groove arrangement. By utilizing a male tip with a complementary female tip that receives the male tip, the two ends of the metal strip or ribbon are self-aligning or have self-alignment features when joined together end-to-end to form a mated end set.

The mated end set can have two ends that are in spatial alignment and/or radial alignment. That is, the complementary surfaces can provide contact between the end surface of the first end and the end surface of the second end to ensure spatial alignment and the female shape of the second tip of the of the second end receives the first tip of the first end and aligning the first end to the second end along the radial direction so that exterior surfaces at the two ends are aligned and not offset to any noticeable amount. After the mated end set is formed, the two ends can be welded to form a weld joint to permanently secure the ends together to form a ribbon spring ring or a V-spring ring.

An end surface of a first end can have a first tip, which can be a male part and can have a flange with a linear length with tapered sidewalls, or sidewalls that converge, rather than parallel sidewalls, similar to a dovetail and groove arrangement or dovetail joint, and wherein the tip most point or end of the flange can be rounded or can be flat. As the sidewalls of the tip of the present embodiment are not parallel, the width at the tip most end can be wider than the width at the base of the first tip.

An end surface of a second end has a second tip and the second tip can be a reversed receiving end or a counterpart female receiving end of the flange, which can be referred to as a dovetail groove. The channel of the second tip can have tapered sidewalls and can terminate at a bottom most point. As the sidewalls of the groove are tapered, the width at the opening of the dovetail groove can be smaller than the width at the bottom of the groove, at the bottom most point.

The notations first end and second end and first tip and second tip used herein are intended to describe two different ends and two different tips to be joined using the contoured joining surfaces with self-alignment features of the present invention. The notations are not limiting and can be used in the reversed. For example, if a first end is said to have a male tip and a second end is said to have a corresponding female tip, then the scope of the invention is understood to cover a first end with a female tip and a second end with a male tip since such designations merely shifted the names of the parts and not the ideas behind them.

A first end can have a first tip with a slot or female receiving end and the second end can have a second tip with a corresponding or counterpart male projection. However, in the present embodiment, a shoulder can be provided around the male projection, or around the second tip. Also, the female channel on the first tip can be recessed from the outer edge to form a blunt surface for abutting the shoulder.

A first end can have a first tip with a slot or female receiving end and the second end can have a second tip with a corresponding male projection. However, instead of being a ribbon, the metal wire section can be a wire. The mating first and second tips of the first and second ends for forming a mated end set of the present embodiment can be considered a tongue and groove arrangement.

A first end can have a first tip and a second end can have a second tip. The first tip and the second tip of the present embodiment can be identical but reversed, or identical reverse counterpart, to allow interlocking in the axial direction. Each tip can have a hook like structure with an extended part having a structure extending axially of the body of the meal wire section and a lip part having a surface extending radially of the extended part. The mating first and second tips of the first and second ends for forming a mated end set of the present embodiment can be considered or called a tabled scarf joint.

Methods of making and of using spring rings and closed wire loops and their applications, such as in a connector or a sealing application, are within the scope of the present invention. The present concept can be used to joint two lengths or two spring lengths together or where a weld is required for two free ends, and not necessarily restricted to a single length to form a closed loop.

BRIEF DESCRIPTION OF THE DRAWINGS

These and other features and advantages of the present devices, systems, and methods will become appreciated as the same becomes better understood with reference to the specification, claims and appended drawings wherein:

FIGS. 4A-4E show different coil shapes for canted coil springs.

FIG. 5 shows spring length and wire combination.

FIGS. 10A-10C show a first end and a second end of a metal wire section and the first and second ends brought together end-to-end.

FIGS. 11A-11C show another embodiment of a first end and a second end of a metal wire section and the first and second ends brought together end-to-end.

FIGS. 12A-12C show another embodiment of a first end and a second end of a metal wire section and the first and second ends brought together end-to-end.

FIGS. 13A-13C show another embodiment of a first end and a second end of a length of ribbon and the first and second ends brought together end-to-end.

FIGS. 14A-14C show another embodiment of a first end and a second end of a length of ribbon and the first and second ends brought together end-to-end.

FIGS. 15A-15C show another embodiment of a first end and a second end of a length of ribbon and the first and second ends brought together end-to-end.

FIGS. 16A-16D show different embodiments first ends and second ends of different metal wire sections and the first and second ends brought together end-to-end.

DETAILED DESCRIPTION

Figure 1:
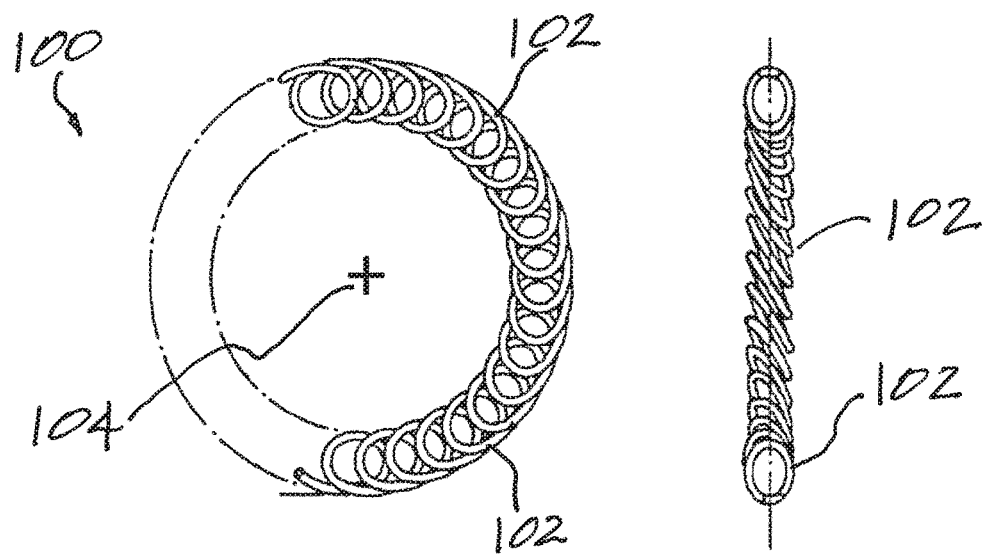
FIG. 1 is a side and cross-sectional view of a canted coil spring ring, which can be an axial canted coil spring.

The detailed description set forth below in connection with the appended drawings is intended as a description of the presently preferred embodiments of springs with contoured ends to facilitate welding and their applications provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

(1) When welding two ends of a metallic spring length together to form a spring ring, also called a garter spring, (2) when welding a two ends of a wire together to form a closed loop or a ring, or (3) when welding two ends of a strip together to form a ring, such as garter shaped ribbon spring, having two ends of the wire or strip aligned to enable welding them together is important to having a good weld. A good weld for a spring ring or a closed loop, as used herein, is understood as more than just joining two ends together for the operating life of the spring ring or the closed loop metal ring. A good weld can be a weld formed when two ends are joined and the ends are aligned to present a good surface area for welding.

Without committing to any particular theory, it is believed that a good weld provides consistent mechanical and electrical properties across the entire ring or loop, including at or around the weld joint. Thus, a good weld joint should start with both spatial alignment and/or radial alignment and then a selection of a weld type for joining the two ends together. That is, and as further discussed below, the joined ends should have proper spatial alignment so that there is minimal, negligible, or no gap between abutted surfaces when brought together and have good radial alignment at the exterior surfaces of the two welded end sections. While spatial alignment may be possible using a traditional single horizontal cut, called a butt joint, or a single slanted cut at each of the two ends, called plain scarf, radial alignment may be problematic with traditional cuts. Thus, aspects of the present invention include ends of a metallic spring length joined to form a spring ring and wherein the ends are provided with contour surfaces that facilitate alignment to then present a good weld surface for welding the two ends.

When the weld joint has a good weld, with good spatial and/or radial alignments, the spring ring or closed loop wire ring is believed to act consistently or uniformly throughout the ring without any significant operational drop in performance at the weld joint. The weld joint is also less susceptible to failure due to reduced internal stress because of the better alignment. For example, when two joined surfaces are mismatched, or out of alignment, a percentage of the surface areas at the two mating ends do not contact. Consequently, higher resistant can be expected at the weld joint in an electrical application or a drop in spring constant or resilient characteristic can be expected when the spring is used in a mechanical application, like a fastener. The higher resistant can cause early failure due to high heat or current passing through the affected area.

Springs with contoured ends discussed herein can be a ribbon spring type, a traditional extension or compression helical spring, a V-spring, or a canted coil spring. The canted coil spring can be a radial canted coil spring, an axial canted coil spring, and a canted coil spring with multiple deflection planes. Exemplary canted coil springs are disclosed in U.S. Pat. Nos. 5,160,122; 5,139,276; 5,139,243; 5,108,078; 4,974,821; 4,964,204; and 4,961,253; US Publication No. 2015/0240900; the contents of which are expressly incorporated herein by reference. For each of the disclosed springs, two ends of a spring length for forming a spring ring can practice the wire ends or ribbon ends disclosed herein.

Further aspects of the present disclosure include use of the springs having wire ends in connector applications, in sealing applications, and in shielding applications, among others. For connector applications, they can be purely mechanical applications, or for both mechanical and electrical applications.

Connectors can be a locking type, a latching type, or a holding type. Exemplary holding and latching types are disclosed in US Pub. No. 2016/0076568 and exemplary locking types are disclosed in U.S. Pat. No. 5,545,842, the contents of which are expressly incorporated herein by reference. The connectors can be pure mechanical connectors, such as a fastener, or can be an electrical connector in which signals or currents pass through the connectors. Exemplary spring energized seals are disclosed in U.S. Pat. Nos. 9,285,034; 6,641,141; 6,264,205; and 5,984,316, the contents of which are expressly incorporated herein by reference. Exemplary EMI shielding is disclosed in U.S. Pat. No. 5,474,309, the contents of which are expressly incorporated herein by reference.

The spring rings and wire rings can be made from a number of metallic materials including copper, copper alloy, aluminum, aluminum alloy, gold, gold alloy, silver, silver alloy, brass, and brass alloy. Additional wires include steel material, such as medical grade stainless steel, titanium, noble metals such as platinum or conventional implantable grade materials with noble metal coatings, such as platinum over stainless steel. The wire may also be a multi-metallic wire in which a base core material is surrounded by one or more other materials. For example, the inner core can be made from copper and the outer layer from stainless steel or can have the reverse arrangement with copper on the outside. In some examples, the spring has an inner core and an outer layer having different material compositions with the outer layer comprising at least one of platinum, iridium, rhodium, rhenium, ruthenium and palladium. The outer layer should have sufficient thickness to provide the spring with an electrical resistance that is within 20% or less of a spring made entirely of at least one of platinum, iridium, rhodium, rhenium, ruthenium and palladium. For electrical connector applications, the spring may be used with a housing and a pin or shaft made from stainless steel type 316L, MP35N, platinum-iridium, titanium or other conductive materials, including being plated or coated with a highly conductive metal, such as silver, copper, gold, and their alloys.

When welding two ends of a wire, which can be ends of a coil spring or ends of a wire are joined to form a loop, or two ends of a strip brought together to form a ring, such as a ribbon spring, it is important for the two ends of the wire or strip to be aligned in order to produce a PW (Point Weld) or a BW (butt weld) weld-type. The better the alignment, the better the weld. The spatial and/or radial alignments of the two weld ends of a wire or a strip are factors to having a good alignment.

With reference now to FIG. 1, an end view of a canted coil spring 100 comprising spring body with a plurality of inter-connected coils 102 in a spring ring configuration with a ring center 104 is shown. The ring center 104 defines an axis passing through the ring, which can alternatively be called a ring axis. FIG. 1 also shows a side cross-section of the canted coil spring 100, to show the shape and orientation of the coils relative to the ring axis. As shown in the side cross-sectional view of FIG. 1, each coil 102 is oriented so that the minor axis of the coil, or the shorter of two axes of the elliptical shaped coil, is aligned to be generally parallel to the ring axis and the major axis, or the longer of the two axes, is generally perpendicular to the ring axis. A common axis passes through the center of each coil 102 may be referred to as a coil axis, which is perpendicular to the ring axis. The coils are all canted generally the same direction, which gives the spring its canting characteristics.

As a canted coil spring typically deflects when a force is applied along the minor axes of the coils, the coils shown will deflect in a direction parallel to the ring axis. Thus, the canted coil spring shown in FIG. 1 may be referred to as an axial canted coil spring since an axial force parallel to the ring axis will cause the coils 102 to deflect along their minor axes.

As further discussed below, a spring length having a spring body with a plurality of interconnected coils with two free ends each with contoured surfaces and the two having complementary surfaces can be welded with a weld joint to form a spring ring, such as the axial canted coil spring shown in FIG. 1.

Figure 2:
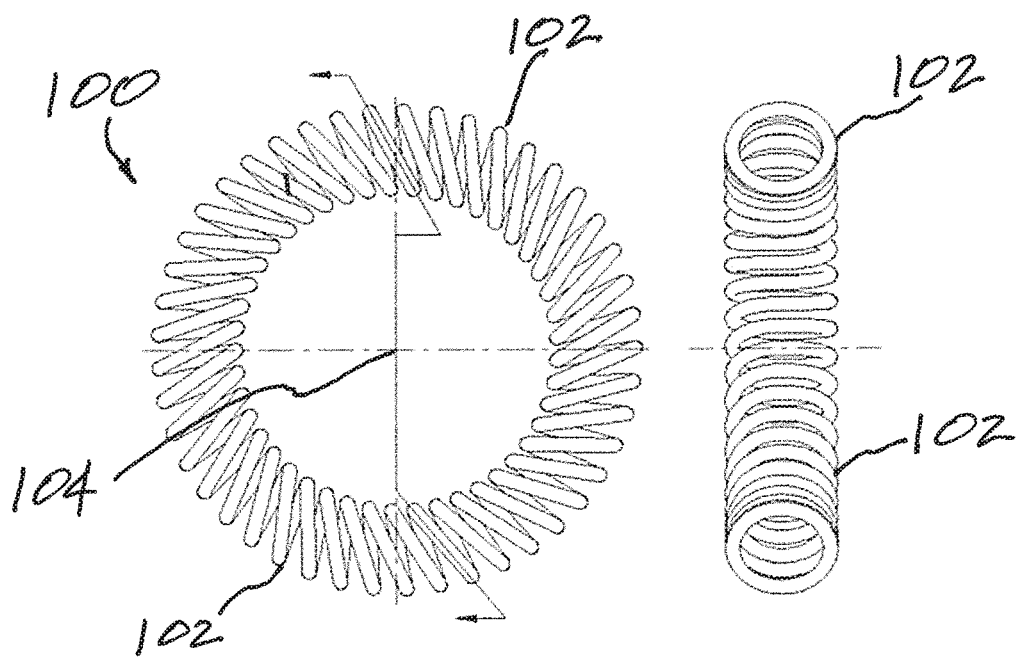
FIG. 2 is a side and cross-sectional view of a canted coil spring ring, which can be a radial canted coil spring.

With reference now to FIG. 2, an end view of a canted coil spring 100 comprising a spring body with a plurality of inter-connected coils 102 in a spring ring configuration with a ring center 104 is shown. The ring center 104 defines an axis passing through the ring, which can alternatively be called a ring axis. FIG. 2 also shows a side cross-section of the canted coil spring 100, to show the shape and orientation of the coils relative to the ring axis. As shown in the side cross-sectional view of FIG. 2, each coil 102 is oriented so that the minor axis of the coil, or the shorter of two axes of the elliptical shaped coil, is aligned to be generally orthogonal or perpendicular to the ring axis and the major axis, or the longer of the two axes, is generally parallel to the ring axis. Thus, the coils of the present embodiment are rotated 90 degrees compared to the coils of FIG. 1.

As a canted coil spring typically deflects when a force is applied along the minor axes of the coils, the coils shown will deflect in a direction perpendicular or radial to the ring axis. Thus, the canted coil spring shown in FIG. 2 may be referred to as a radial canted coil spring since a radial force perpendicular to the ring axis will cause the coils to deflect along their minor axes. A common axis passes through the center of each coil 102 and may be referred to as a coil axis, which is perpendicular to the ring axis.

As further discussed below, a spring length having a spring body with a plurality of interconnected coils with two free ends each with contoured surfaces and the two having complementary surfaces can be welded with a weld joint to form a spring ring, such as the radial canted coil spring shown in FIG. 2.

Given the above, when a canted coil spring is located in a groove and the major axes or the minor axes of the coils are rotated 45 degrees, for example, the coils can be restrained within a groove of a housing, a pin, or a seal element at a rotated position, the axial canted coil spring of FIG. 1 and the radial canted coil spring of FIG. 2 can be expected to act the same and provide the same deflection or biasing response, all else being equal.

For a canted coil spring, the further the deflecting force moves away from the end points of a minor axis of a coil, the higher is the force required to deflect the coil since part of the force is re-directed in the axial direction as the applied force moves away from end points of the minor axis. When the deflecting force is directed generally at end points of a major axis, the coils will not defect without destroying or causing the coils to buckle since the coils do not deflect along their major axes.

Figure 3A:
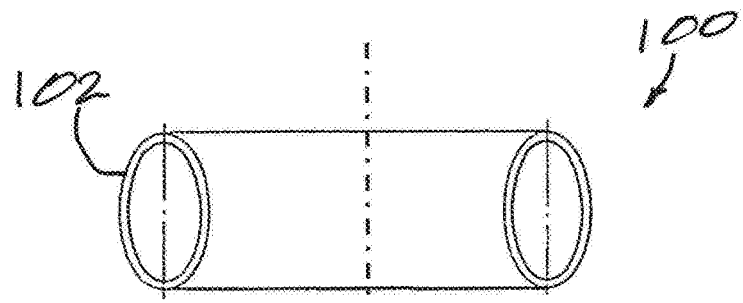
FIGS. 3A-3E show spring rings with coils that orientate in different angular positions.
Figure 3B:
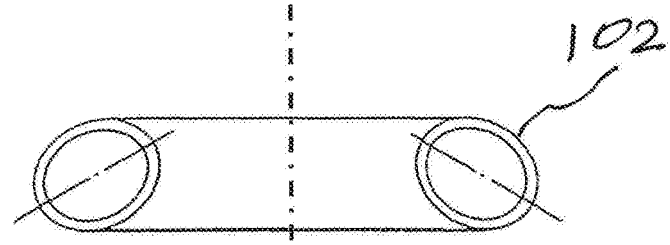
Figure 3C:
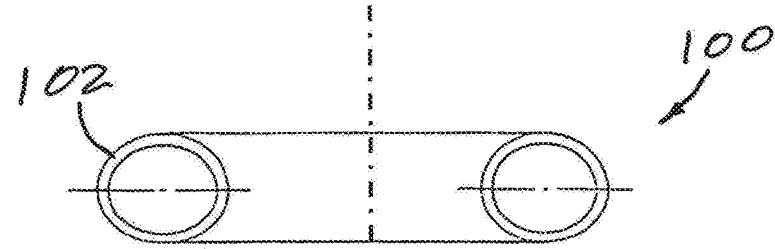
Figure 3D:
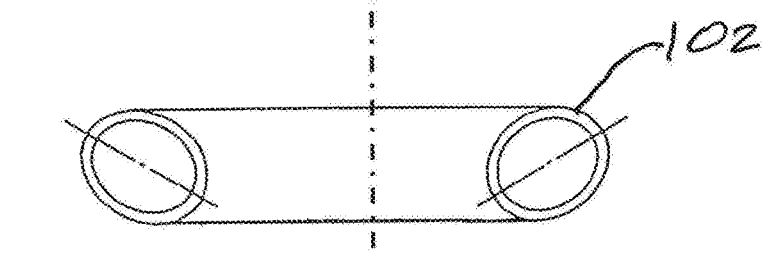
Figure 3E:
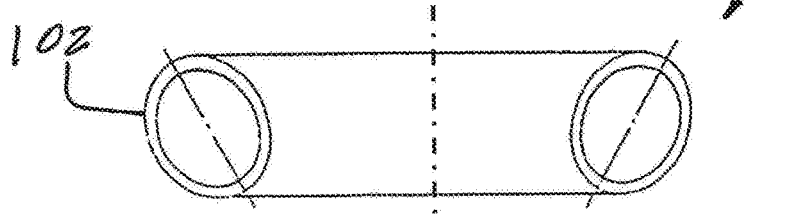

With reference now to FIGS. 3A-3E, cross-sectional end views of different spring rings with different coil turned angles are shown. For each spring ring, the ring axis passes between the two coils 102 shown, general perpendicular to the top or bottom of the page. FIG. 3A shows the coils oriented with the minor axes perpendicular to the ring axis. Thus, FIG. 3A shows a radial canted coil spring similar to the canted coil spring of FIG. 2. FIG. 3B shows the major axes of the coils turned at an angle to the ring axis, in a clockwise or counter-clockwise rotation depending on how the spring ring is used. The coils of FIG. 3D are turned opposite the coils of FIG. 3B and can be a counter-clockwise turned angle spring if the spring ring of FIG. 3B is a clockwise turned angle. FIG. 3C shows an axial canted coil spring, similar to the canted coil spring of FIG. 1. FIG. 3E shows a turned angle spring with coils turned at a different angle than the coils of FIGS. 3B and 3D.

Of interested is the fact that a turned angle canted coil spring can be coiled to take on an angle, as desired or selected, when two ends of a spring length are joined, also referred to as a free standing turned angle canted coil spring. In other words, the coils can turn when in free standing, outside of a groove. When a radial canted coil spring or an axial canted coil spring is located in a groove that has been sized and dimensioned to turn the coils within the groove, the coils can operate at a turned angle.

While typical canted coil springs have coils that are generally elliptical in shape, canted coil springs with coils that are non-elliptical can also be used with contoured ends of the present invention. With reference now to FIGS. 4A-4E, different coil shapes are shown that can be practiced with canted coil springs described herein. FIG. 4A shows a coil 102 that resembles an elliptical coil but wherein one of the sides is flat, resembling a letter "D". FIG. 4B shows an elongated coil, resembling an oval shape. FIG. 4C shows a polygonal shape coil that resembles a square. FIG. 4D shows another polygonal shape coil that resembles a rectangle. FIG. 4E shows a triangular shape coil. In all instances, the coils as shown can be coiled and deflected generally along the same direction so that a force radial to the coils, when viewing a spring length with two free ends or either parallel or perpendicular to a ring axis when viewing a spring ring, can be applied to deflect the coils, not just stretch or compress the coils along the coil axis.

Coils having different shapes than as shown in FIGS. 4A-4E are also contemplated. For example, canted coil springs with contoured ends described herein can be practiced with a coil shape as shown in U.S. Publication No. 2017/0025779 and in U.S. Publication No. 2017/0261108, the contents of which are expressly incorporated herein by reference.

FIG. 5 shows a spring length 110 having two canted coil spring lengths or sections 112, each section with a spring body having a plurality of coils 102, joined to one another by wire lengths 116. The wire lengths 116 can be un-coiled sections of a wire used to coil the canted coil spring sections. Different combination wire lengths 116 and canted coil spring sections 112 can be joined together with a weld joint 400. Two free ends 124, 126 of a length can be joined with a weld joint to form a spring ring or a closed loop.

The coils 102 from the two sections 112 can cant in different directions as shown or cant in the same direction. The spring length 110 with the combination coil sections 112 and wire sections 116 of FIG. 5 may be utilized to wrap around an object and to arrange the canting direction of the coils around different surfaces of the object. For example, the coils with different canting directions can nonetheless cant in the same direction when wrapped around an object, such as a top surface and an opposed bottom surface, so that insertion of the coils and the object into a bore can result in moving the coils in the same canting direction.

Figure 6:
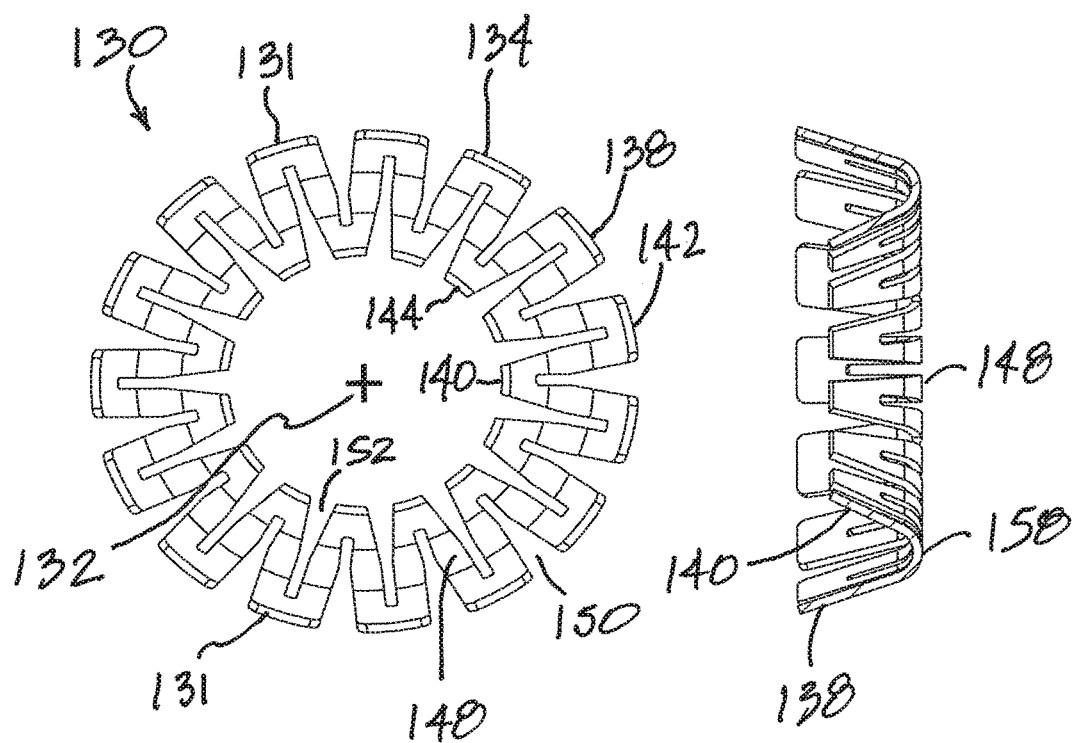
FIG. 6 shows a side and cross-sectional view of a V-spring ring.

FIG. 6 shows an end view of a V-spring 130 in a spring ring configuration, which is understood to mean a closed loop or wherein two ends of a spring section are attached together, such as by a weld joint. The V-spring 130 has a generally cylindrical inner circumference defining a bore having a spring ring center 132 and an outer circumference 134 defining an outer diameter. The spring ring center 132 can also be the spring ring centerline of the V-spring 130.

With further reference to the sectional view of the V-spring 130, the spring is formed by connecting two ends of a spring body comprising a plurality of interconnected V-bodies 131 each with two legs 138, 140 and leg having an end edge 142, 144. In an example, the two legs 138, 140 of each V-body 131 are of similar sizes and the V-body is generally symmetrical through the apex of the V-body. In an alternative embodiment, each of the V-bodies 131 of the present V-spring 130 comprises two legs 138, 140 of unequal lengths, which can include a long leg 138 and a short leg 140 joined to one another by a connecting end or a connecting portion or connecting end 148. When measuring the two legs 138, 140 using the same parameters, the term longer leg is understood to mean having a greater length measurement than the shorter leg.

The long leg 138 can have a terminal end edge 142 that is wider than the terminal end edge 144 of the short leg 140. In other examples, the relative widths can reverse so that the width of the terminal end edge 144 of the short leg 140 can be wider than the width of the terminal end edge 142 of the long leg 138. In still other examples, the width at the base of the long leg can be equal to the width at the base of the short leg. In other examples, the widths at the two bases can be unequal. Unlike a conventional V-shaped body of a V-spring, each V-shaped body 131 of the present spring 130 can be asymmetrical along a plane through the apex of the V-shaped body. However, it is understood that the present invention covers conventional V-springs as well as asymmetrical V-springs with shaped ends to facilitate welding the two ends together to form a spring ring.

Each long leg 138 can be spaced from an adjacent long leg 138 by a gap 150 and each short leg 140 can be spaced from an adjacent short leg 140 by a gap 152. The two gaps 150, 152, defined by the side edge surfaces of the long legs and short legs, can have the same contour or be different.

Further, the two gaps 150, 152, as measured in distance or length, can have the same or dissimilar measurements.

The side cross-sectional view clearly shows a V-spring 130 with a plurality of V-bodies 131 each with a short leg 140 and a long leg 138. If the apex 158 of a connecting end or connecting portion 148 of each pair of long leg and short leg serves as the base or origin of a V-body 131, the length of the long leg 138 extends further outwardly in the axial direction away from the origin, axially relative to the spring ring centerline, than the length of the short leg 140. In some examples, the long leg 138 extends about 5% to 45% longer in the axial direction than the short leg 140. Said differently, the long leg and the short leg can both extend along a same direction and wherein the long leg can extend a greater amount in that direction, relative to an origin, than the short leg, by about 5% to 45% greater. In the symmetrical version, the two legs can extend about the same distance or length.

As shown, each short leg 140 has a base near or at the apex 158 having a width and a terminal end edge 144 having a width and wherein the width of the base is larger than the width of the terminal end edge 144 of the short leg 140. Similarly, each long leg 138 has a base near or at the apex 158 having a width and a terminal end edge 142 having a width and wherein the width of the base is larger than the width of the terminal end edge 142 of the long leg 138.

In an example, the V-spring 130 can be stamped from a metal blank and then forged or cold formed with an apex running down the length of the cold-worked metal piece. The stamped metal sheet with cut-outs for forming gaps can be called a ribbon or a strip. The gaps 150, 152, and possibly other cut-outs, allow the stamped blank to be bent into the final shape shown. Two free ends can be brought together and joined, such as by welding, to form a spring ring. In some examples, the metal material can be a highly conductive metal, such as bronze, copper, or alloys thereof. The spring can alternatively be made from an aluminum material. In other examples, the spring can be made from a steel material, such as stainless steel, carbon steel, or alloy steel. Optionally, the metal material may be plated with a corrosion resistant outer layer, such as titanium or HASTELLOY®. Thus, the V-spring used herein can have a single metal material formed throughout or can have a first inner metal layer surrounded by a second outer metal layer. Other springs described herein can be made from similar material options.

Figure 7:
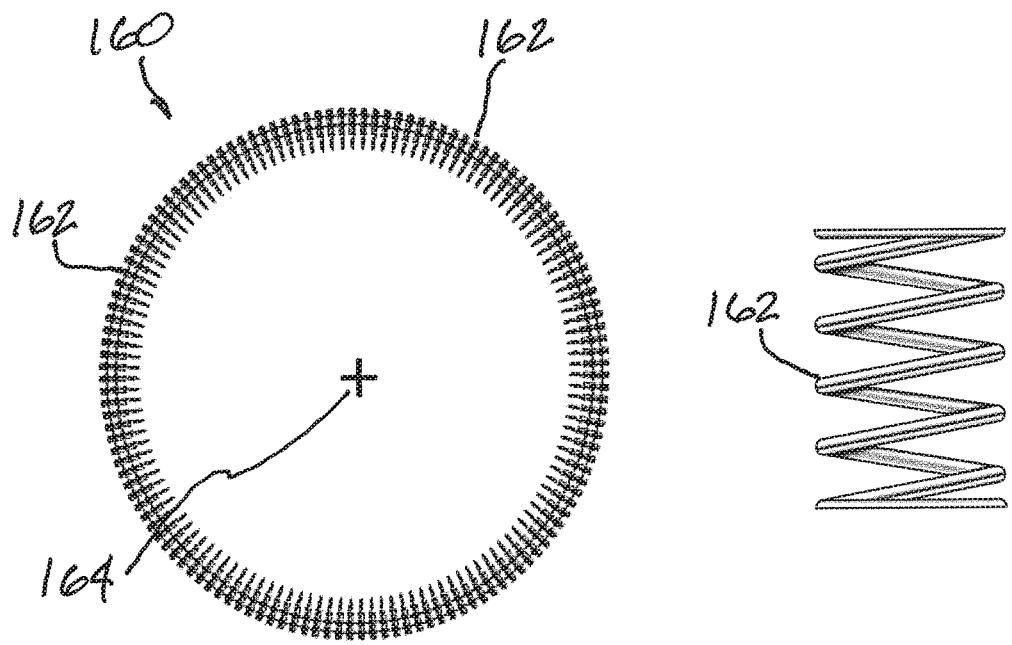
FIG. 7 shows a side and cross-sectional view of a helical spring ring.

FIG. 7 shows an end view of a helical spring 160 comprising spring body with a plurality of inter-connected coils 162 in a spring ring configuration with a ring center 164. The ring center 164 defines an axis passing through the ring, which can alternatively be called a ring axis. FIG. 7 also shows a side cross-section of the helical spring 160 to show the shape and orientation of the coils relative to the ring axis. As shown in the side cross-sectional view of FIG. 7, each coil 102 is orientated with the front and back curves that resemble a saw tooth, which differs from the canted coils of FIGS. 1 and 2. As such, the coils of the present helical spring 160 do not compress when a radial force is applied to the coils, unlike canted coil springs. Instead, helical springs can only stretch, also called gartering, or compress.

When in a spring ring configuration as shown, the helical spring 160 can expand like a rubber-band or compress until the adjacent coils are butted. However, the coils do not cant as the coiling of a helical spring in a saw tooth-like coils do not cant. The spring ring 160 of FIG. 7 can be formed by taking a length of standard extension or compression spring and attaching the two ends together using shaped ends as further described below.

Figure 8:
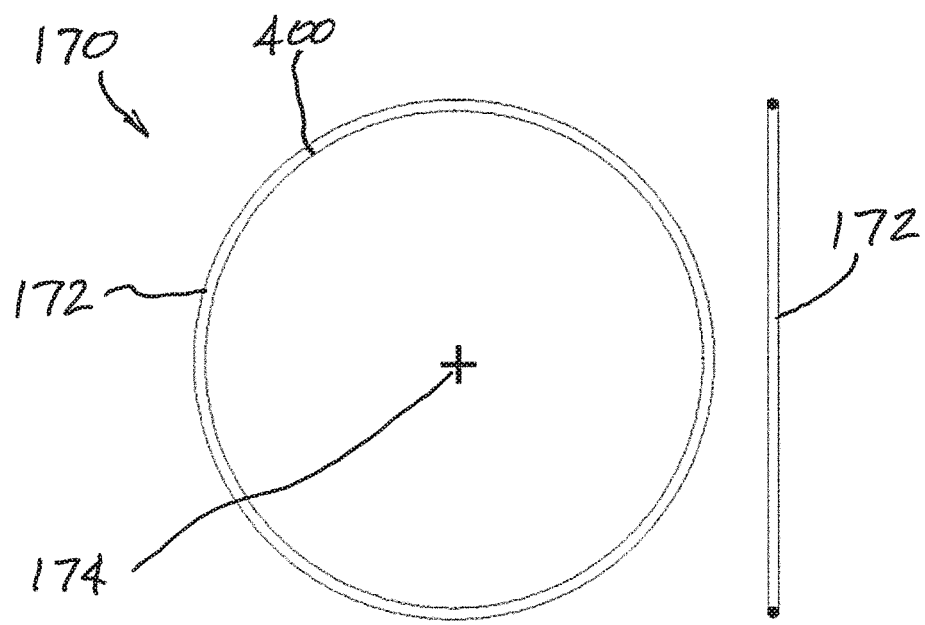
FIG. 8 shows a side and cross-sectional view of closed wire ring loop.

FIG. 8 shows an end view and a side cross-section of a wire ring 170 comprising a single metal wire 172 coiled in a ring shape and joined together with a weld joint 400. The wire ring 170 has a ring center 174. The ring center 174 defines an axis passing through the ring, which can alternatively be called a ring axis. FIG. 8 also shows a side cross-section of the wire. As further discussed below, two ends of the wire 172 can be joined and wherein the ends can be shaped to facilitate welding.

In an example, a metal wire 172 can be placed in the central space of the coils of a canted coil spring, such as down the coil axis, and then welded to form a wire ring 170 running along the coil axis of a canted coil spring ring. The wire ring can be used to limit or restrict the amount of gartering of the canted coil spring ring. For example, when a combination canted coil spring ring and wire ring is used in a groove of a connector, the wire ring can assist in preventing the canted coil spring from popping or jumping out of the groove due to gartering.

Figure 9:
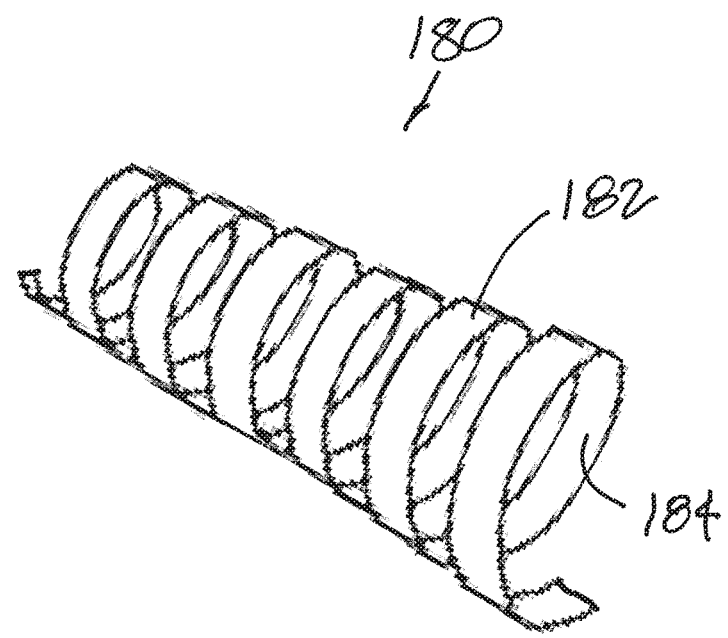
FIG. 9 is a perspective view of a ribbon spring length that can form a ribbon spring ring by joining two ends of the spring length together using complementary surfaces in accordance with aspects of the invention.

FIG. 9 is a perspective view of a ribbon spring 180 comprising a spring length with a spring body having a plurality of interconnected coils. A ribbon spring 180 is like a helical spring but formed by coiling a metal ribbon 182 instead of a metal wire. The ribbon spring can be formed in a long length and then cut to size to form a particular spring ring size. Each coil is a revolution of the ribbon 184 in a helical pattern. Thus, FIG. 8 shows a spring body with a plurality of interconnected ribbon coils. Each coil 184 can be coiled to a range of sizes and the ribbon 182 can have different dimensions and material properties to form a ribbing spring of desired characteristics. Two free ends of a ribbon spring length can be joined, such as with a weld joint, to from a ribbon spring ring. The free ends can have contoured shapes and complementary surfaces as further described herein below to facilitate welding them together to form a spring ring.

With reference now to FIGS. 10A-10C, schematic views of two different wire ends 200, 202 of a metal wire section 220 to be joined to form a spring ring. For example, the two ends 200, 202 shown can be two ends of the spring ring of FIG. 1. The metal wire section 220 can represent a wire length for forming a wire loop, such as shown in FIG. 8, or a spring section or length having a spring body with a plurality of interconnected coils for forming a spring ring, such as shown in FIGS. 1, 2, and 7. Thus, the two ends 200, 202 can be ends of a wire or ends of a spring length. The metal wire section 220 can have any number of sizes or gauges for use in a spring ring application.

The two ends 200, 202 have contoured shapes with complementary surfaces, such as a male projection and a counterpart female receiving end, to facilitate spatial and/or radial alignments when placed together to form a mated end set 206 to then form a weld joint 400 to permanently secure them together. The two wire ends 200, 202 can be identified as a first end or first part 200 and a second end or second part 202. The wire ends 200, 202 can be the two free ends of a section of a wire or two free ends of a section of a spring length with a spring body having a plurality of interconnected coils. Foreseeably, the two free ends can also be different ends of two different lengths and then the ends are joined to form a single length of a wire or a single length of a spring.

FIG. 10A shows a first end or first part 200 of a metal wire section 220 looking down the end surface 208 of the first end 200 and a side cross-sectional view of the first end 200 to more clearly show the shape of the end surface 208. As shown, the end surface 208 of the first end 200 has a first tip 210a, which can be a male part or male projection and can have a pointed tip or a conical shape tip, similar to a pencil tip, and wherein the tip most point 212 of the conical shape can be somewhat rounded or can be pointed. The first tip 210a can have a sloped surface, conical in circumference, that terminates at the tip most point 212. When viewing the cross-sectional view, the first tip 210a resembles an inverted V-shape.

FIG. 10B shows a second end or second part 202 of the same metal wire section 220 of FIG. 10A but looking down the end surface 216 of the second end 202. FIG. 10B also shows a side cross-sectional view of the second end 202 to more clearly show the shape of the end surface 216. As shown, the end surface 216 of the second end 202 has a second tip 210b and the second tip can be a reversed conical shape receiving end or a counterpart female receiving end of the conical shape tip of FIG. 10A, and wherein the bottom most point 218 can be somewhat rounded or can be pointed and can be sized to receive the tip most part of the first tip 210a. The second tip 210b can have a sloped surface that bottoms out or terminates at a bottom most point 218. When viewing the cross-sectional view, the second tip 210b resembles a V-shape.

FIG. 10C shows the first end 200 and the second end 202 of the metal wire section 220 of FIGS. 10A and 10B brought together end-to-end to form a mated end set 206. The first tip 210a of the first end 200 and the second tip 210b of the second end 202 are complementary with alignment features. That is, by utilizing a male tip with a complementary female tip that receives the male tip, the two ends 200, 202 of the metal wire section 220 are self-aligning or have self-alignment features when joined together to form a mated end set 206.

The mated end set 206 have two ends 200, 202 that are in spatial alignment and radial alignment. That is, the complementary shapes, when brought together, causes an abutting surface on the first tip, which can be the tip most point of the sloped conical surface, to contact an abutting surface on the second tip, such as the bottom most point 218 or the female conical surface, for spatial alignment. Further, the closed circumference of the counterpart female receiving end 210b of the second end causes a radial surface on the first tip to contact a radial surface on the second tip for radial alignment along at least one direction. That is, looking at FIG. 10C, the two ends do not move radially of the length shown due to the mated complementary surfaces. Consequently, the complementary surfaces of the two ends provide contact between the end surface 208 of the first end 200 and the end surface 216 of the second end, or other surfaces at the two tips, to ensure spatial alignment and the female shape of the second tip 210b of the of the second end 202 receives the first tip 210a of the first end 200 and aligning the first end to the second end along the radial direction so that exterior surfaces 226 at the two ends are aligned and not offset to any noticeable amount. After the mated end set 206 is formed, the two ends 200, 202 can be welded to form a weld joint 400 to permanently secure the ends together to then form a closed loop ring or a spring ring. Thus, the spring rings described herein can have ends that resemble the mated end set 206 shown in FIG. 10C prior to welding.

FIGS. 11A-11C depict schematic views of two different wire ends 200, 202 of a metal wire section 220 to be brought together end-to-end, similar to FIGS. 10A-10C. Thus, the two ends 200, 202 shown with reference to FIGS. 11A-11C can be ends of a wire or ends of a spring length having a spring body with a plurality of interconnected coils. The two ends 200, 202 have contoured shapes with complementary male projection and counterpart female receiving end to facilitate spatial and/or radial alignments when placed together to form a mated end set 206 to then form a weld joint 400 to permanently secure them together.

FIG. 11A shows a first end or first part 200 of a metal wire section 220 looking down the end surface 208 of the first end and a side cross-sectional view of the first end 200 to more clearly show the shape of the end surface 208. As shown, the end surface 208 of the first end 200 has a first tip 210a, which can be a male part or a male projection and can have a flat tip, similar to a flat tip of a screw driver, and wherein the tip most point 212 of the flat tip can have an edge 232 with a length. The first tip 210a can have a sloped surface on either side of the edge 232 that terminates at the tip most point 212. When viewing the cross-sectional view, the first tip 210a resembles an inverted V-shape.

FIG. 11B shows a second end or second part 202 of the same metal wire section 220 as FIG. 11A looking down the end surface 216 of the second end and a side cross-sectional view of the second end 202 to more clearly show the shape of the end surface 216. As shown, the end surface 216 of the second end 202 has a second tip 210b and the second tip can be a reversed receiving end, a counterpart female receiving end, or a complementary female receiving end of the flat tip of FIG. 11A, and wherein the bottom most point 218 can be a strip and can be sized to receive the edge of the first tip 210a. When viewing the cross-sectional view, the second tip 210b resembles a V-shape.

FIG. 11C shows the first end 200 and the second end 202 of the metal wire section 220 of FIGS. 11A and 11B joined to form a mated end set 206. The first tip 210a of the first end 200 and the second tip 210b of the second end 202 are complementary with alignment features. That is, by utilizing a male tip or projection with a complementary or counterpart female tip or receiving end that receives the male tip, the two ends 200, 202 of the metal wire section 220 are self-aligning or have self-alignment features when joined to form a mated end set 206.

The mated end set 206 have two ends 200, 202 that are in spatial alignment and/or radial alignment. That is, the complementary shapes provide contact between the end surface 208 of the first end 200 and the end surface 216 of the second end to ensure spatial alignment and the female shape of the second tip 210b of the of the second end 202 receives the first tip 210a of the first end 200 and aligning the first end to the second end along the radial direction so that exterior surfaces 226 at the two ends are aligned and not offset to any noticeable amount. That is, when the two ends 200, 202 are brought together, the action causes an abutting surface on the first tip, which can be the tip most point of the sloped surfaces, to contact an abutting surface on the second tip, such as the bottom most point 218 or the female tapered surfaces, for spatial alignment. Further, the partially confined female receiving end of the second end causes a radial surface on the first tip to contact a radial surface on the second tip for radial alignment along at least one direction. That is, looking at FIG. 11C, the two ends do not move radially of the length shown due to the mated complementary surfaces, in at least one radial direction. After the mated end set 206 is formed, the two ends 200, 202 can be welded to form a weld joint 400 to permanently secure the ends together to then form a closed loop ring or a spring ring.

FIGS. 12A-12C depict schematic views of two different wire ends 200, 202 of a metal wire section 220 to be joined, similar to FIGS. 10A-10C and FIGS. 11A-11C. Thus, the two ends 200, 202 shown with reference to FIGS. 12A-12C can be ends of a wire or ends of a spring length having a spring body with a plurality of interconnected coils. The two ends 200, 202 have contoured shapes to facilitate spatial and/or radial alignments when placed together to form a mated end set 206 to then form a weld joint 400 to permanently secure them together.

FIG. 12A shows a first end or first part 200 of a metal wire section 220 looking down the end surface 208 of the first end and a side cross-sectional view of the first end 200 to more clearly show the shape of the end surface 208. As shown, the end surface 208 of the first end 200 has a first tip 210a, which can be a stub, similar to a short cylinder, and wherein the tip most point 212 of the first tip 210 can have round planar surface. A planar surface 232 at the base of the first tip 210a can function as a shoulder.

FIG. 12B shows a second end or second part 202 of the same metal wire section 220 of FIG. 12A looking down the end surface 216 of the second end and a side cross-sectional view of the second end 202 to more clearly show the shape of the end surface 216. As shown, the end surface 216 of the second end 202 has a second tip 210b and the second tip can be a reversed receiving end, a counterpart female receiving end, or a complementary female receiving end of the stub of FIG. 12A, and wherein the bottom most point 218 can be a corresponding round planar surface and can be sized to match the end tip 230 of the first tip 210a. The second tip 210b of the present embodiment can be described as a receiving bore.

FIG. 12C shows the first end 200 and the second end 202 of the metal wire section 220 of FIGS. 12A and 12B joined to form a mated end set 206. The first tip 210a of the first end 200 and the second tip 210b of the second end 202 are complementary with alignment features. That is, by utilizing a male tip with a complementary female tip that receives the male tip, the two ends 200, 202 of the metal wire section 220 are self-aligning or have self-alignment features when joined together to form a mated end set 206.

The mated end set 206 have two ends 200, 202 that are in spatial alignment and radial alignment. That is, the complementary shapes provide contact between the end surface 208 of the first end 200 and the end surface 216 of the second end to ensure spatial alignment and the female shape of the second tip 210b of the of the second end 202 receives the first tip 210a of the first end 200 and aligning the first end to the second end along the radial direction so that exterior surfaces 226 at the two ends are aligned and not offset to any noticeable amount. That is, when the two ends 200, 202 are brought together, the action causes an abutting surface on the first tip, which can be the tip of the stub, to contact an abutting surface on the second tip, such as the bottom most point 218 or the female slot, for spatial alignment. Further, the closed loop of the female receiving end of the second end causes a radial surface on the first tip to contact a radial surface on the second tip for radial alignment along at least one direction. That is, looking at FIG. 11C, the two ends do not move radially of the length shown due to the mated complementary surfaces, in at least one radial direction. After the mated end set 206 is formed, the two ends 200, 202 can be welded to form a weld joint 400 to permanently secure the ends together to then form a closed loop ring or a spring ring.

In an alternative embodiment, the first end 200 and the second end 202 of the wire can be provided with a tongue and groove complementary tips. For example, instead of a stub as shown in FIG. 12A, the first tip 210 can have an edge and instead of a receiving bore as shown in FIG. 12B, the second tip can have a channel and wherein the two ends can form a mated end set 206 that resembles a tongue and groove engagement. This alternative embodiment is further discussed with reference to FIG. 16B.

With reference now to FIGS. 13A-13C, schematic views of two different strip ends 240, 242 of a metal strip or ribbon 246 to be joined are shown. The metal wire strip or ribbon 220 can represent a strip length having a spring body with a plurality of interconnected coils and two ends that can be joined for forming a spring ring, such as shown in FIGS. 6 and 9. Thus, the two ends 240, 242 can be ends of a ribbon length or a strip length. The two ends 240, 242 have contoured shapes and complementary surfaces to facilitate spatial and/or radial alignments when placed together to form a mated end set 248 to then weld on to form a weld joint 400 to permanently secure them together. The two ribbon ends 240, 242 can be identified as a first end or first part 240 and a second end or second part 242 of the same spring body. The ribbon ends 240, 242 can be the two free ends of a section of a ribbon, such as two ends of a ribbon spring length comprising a spring body with a plurality of ribbon coils or two ends of a spring body comprising a plurality of V-bodies, also referred to as a spring length. Foreseeably, the two free ends can also be different ends of two different lengths of ribbons and then the ends are joined to form a single length of a ribbon or strip or a single length of a ribbon spring.

FIG. 13A shows a first end or first part 240 of a metal strip or ribbon 246 looking down the end surface 208 of the first end 240 and a side cross-sectional view of the first end 240 of the metal strip to more clearly show the shape of the end surface 208. As shown, the end surface 208 of the first end 240 of the metal strip or ribbon has a first tip 210a, which can be a male part or projection that can have a flat tip, similar to flat tip screw driver, and wherein the tip most point 212 of the flat tip can be somewhat rounded or can be flat. The first tip 210a can have a sloped surface on either side of the flat tip that terminates at the tip most point 212, rather than a flat wall with a flat tip. When viewing the cross-sectional view, the first tip 210a resembles a V-shape.

FIG. 13B shows a second end or second part 242 of the same metal ribbon or strip 246 of FIG. 13A looking down the end surface 216 of the second end and a side cross-sectional view of the second end 242 to more clearly show the shape of the end surface 216. As shown, the end surface 216 of the second end 242 has a second tip 210b and the second tip can be a reversed receiving end or a counterpart female receiving end of the flat tip of FIG. 13A, and wherein the bottom most point 218 can be somewhat rounded and can be sized to receive the tip most part of the first tip 210a. The second tip 210b can have a sloped surface that bottoms out or terminates at a bottom most point 218. When viewing the cross-sectional view, the second tip 210b resembles a V-shape.

FIG. 13C shows the first end 240 and the second end 242 of the metal strip or ribbon 246 of FIGS. 13A and 13B joined to form a mated end set 248. The first tip 210a of the first end 240 and the second tip 210b of the second end 242 are complementary with alignment features to facilitate alignment and improved weld joint. That is, by utilizing a male tip with a complementary female tip or counterpart female receiving end that receives the male tip, the two ends 240, 242 of the metal strip or ribbon 246 are self-aligning or have self-alignment features when joined together to form a mated end set 248.

The mated end set 248 have two ends 240, 242 that are in spatial alignment and/or radial alignment. That is, the complementary shapes provide contact between the end surface 208 of the first end 240 and the end surface 216 of the second end 242 to ensure spatial alignment and the female shape of the second tip 210*b* of the of the second end 242 receives the first tip 210*a* of the first end 240 and aligning the first end to the second end along the radial direction so that exterior surfaces 252 at the two ends are aligned and not offset to any noticeable amount. After the mated end set 248 is formed, the two ends 240, 242 can be welded to form a weld joint 400 to permanently secure the two ends together to form a ribbon spring ring or a V-spring ring.

With reference now to FIGS. 14A-14C, schematic views of two different strip ends 240, 242 of a metal strip or ribbon 246 to be joined are shown, similar to FIGS. 13A-13C. The two ends 240, 242 have contoured shapes and complementary surfaces to facilitate spatial and radial alignments when joined end-to-end to form a mated end set 248 to then form a weld joint 400 to permanently secure them together. The two ribbon ends 240, 242 can be identified as a first end or first part 240 and a second end or second part 242. The ribbon ends 240, 242 can be the two free ends of a section of a ribbon, such as two ends of a ribbon spring length comprising a spring body with a plurality of ribbon coils or two ends of a spring body comprising a plurality of V-bodies, also referred to as a spring length. Foreseeably, the two free ends can also be different ends of two different lengths of ribbons and then the ends are joined to form a single length of a ribbon or strip or a single length of a ribbon spring.

FIG. 14A shows a first end or first part 240 of a metal strip or ribbon 246 looking down the end surface 208 of the first end 240 and a side cross-sectional view of the first end 240 to more clearly show the shape of the end surface 208. As shown, the end surface 208 of the first end 240 has a first tip 210*a*, which can be a male part or male projection and can have a flange with a linear length, similar to a tongue in a tongue and groove arrangement, and wherein the tip most point or end 212 of the flange can be rounded or can be flat. The first tip 210*a* can have parallel sidewalls on either side of the tip most point 212.

FIG. 14B shows a second end or second part 242 of a metal ribbon or strip 246 looking down the end surface 216 of the second end and a side cross-sectional view of the second end 242 to more clearly show the shape of the end surface 216. As shown, the end surface 216 of the second end 242 has a second tip 210*b* and the second tip can be a reversed receiving end or a counterpart female receiving end of the flange of FIG. 14A, which can be referred to as a channel. The bottom most point 218 of the second tip 210*b* can be rounded or flat and can be sized to receive the tip most end of the first tip 210*a*. The channel of the second tip 210*b* can have parallel sidewalls and can terminate at a bottom most point 218.

FIG. 14C shows the first end 240 and the second end 242 of the metal strip or ribbon 246 of FIGS. 14A and 14B joined to form a mated end set 248. The first tip 210*a* of the first end 240 and the second tip 210*b* of the second end 242 have complementary surfaces with alignment features. The complementary surfaces of the two ends 240, 242 of the present embodiment are often referred to as a tongue and groove arrangement. By utilizing a male tip with a complementary female tip that receives the male tip, the two ends 240, 242 of the metal strip or ribbon 246 are self-aligning or have self-alignment features when joined together end-to-end to form a mated end set 248.

The mated end set 248 have two ends 240, 242 that are in spatial alignment and/or radial alignment. That is, the complementary surfaces provide contact between the end surface 208 of the first end 240 and the end surface 216 of the second end 242 to ensure spatial alignment and the female shape of the second tip 210*b* of the of the second end 242 receives the first tip 210*a* of the first end 240 and aligning the first end to the second end along the radial direction so that exterior surfaces 252 at the two ends are aligned and not offset to any noticeable amount. After the mated end set 248 is formed, the two ends 240, 242 can be welded to form a weld joint 400 to permanently secure the ends together to form a ribbon spring ring or a V-spring ring.

With reference now to FIGS. 15A-15C, schematic views of two different strip ends 240, 242 of a metal strip or ribbon 246 to be joined are shown, similar to FIGS. 13A-13C and 14A-14C. The two ends 240, 242 have contoured shapes and complementary surfaces to facilitate spatial alignment and/or radial alignment when placed together to form a mated end set 248 to then form a weld joint 400 to permanently secure them together. The two ribbon ends 240, 242 can be identified as a first end or first part 240 and a second end or second part 242. The ribbon ends 240, 242 can be the two free ends of a section of a ribbon, such as two ends of a ribbon spring length comprising a spring body with a plurality of ribbon coils or two ends of a spring body comprising a plurality of V-bodies, also referred to as a spring length. Foreseeably, the two free ends can also be different ends of two different lengths of ribbons and then the ends are joined to form a single length of a ribbon or strip or a single length of a ribbon spring.

FIG. 15A shows a first end or first part 240 of a metal strip or ribbon 246 looking down the end surface 208 of the first end 240 and a side cross-sectional view of the first end 240 to more clearly show the shape of the end surface 208. As shown, the end surface 208 of the first end 240 has a first tip 210*a*, which can be a male part and can have a flange with a linear length with tapered sidewalls, or sidewalls that converge, rather than parallel sidewalls, similar to a dovetail and groove arrangement or dovetail joint, and wherein the tip most point or end 212 of the flange can be rounded or can be flat. As the sidewalls of the tip are not parallel, the width at the tip most end 212 is wider than the width at the base of the first tip 210*a*.

FIG. 15B shows a second end or second part 242 of the same metal ribbon or strip 246 as FIG. 15A looking down the end surface 216 of the second end and a side cross-sectional view of the second end 242 to more clearly show the shape of the end surface 216. As shown, the end surface 216 of the second end 242 has a second tip 210*b* and the second tip can be a reversed receiving end or a counterpart female receiving end of the flange of FIG. 14A, which can be referred to as a dovetail groove. The channel of the second tip 210*b* can have tapered sidewalls and can terminate at a bottom most point 218. As the sidewalls of the groove are tapered, the width at the opening of the dovetail groove is smaller than the width at the bottom of the groove, at the bottom most point 218.

FIG. 15C shows the first end 240 and the second end 242 of the metal strip or ribbon 246 of FIGS. 15A and 15B joined to form a mated end set 248. The first tip 210*a* of the first end 240 and the second tip 210*b* of the second end 242 have complementary surfaces with alignment features. The complementary surfaces of the two ends 240, 242 are often referred to as a dovetail joint. By utilizing a male tip with a complementary female tip that receives the male tip, the two ends 240, 242 of the metal strip or ribbon 246 are self-aligning or have self-alignment features when joined together to form a mated end set 248.

The mated end set 248 have two ends 240, 242 that are in spatial alignment and/or radial alignment. That is, the complementary surfaces have shapes that provide contact between the end surface 208 of the first end 240 and the end surface 216 of the second end 242 to ensure spatial alignment and the female shape of the second tip 210b of the of the second end 242 receives the first tip 210a of the first end 240 and aligning the first end to the second end along the radial direction so that exterior surfaces 252 at the two ends are aligned and not offset to any noticeable amount. After the mated end set 248 is formed, the two ends 240, 242 can be welded to form a weld joint 400 to permanently secure the ends together to form a ribbon spring ring or a V-spring ring.

The notations first end and second end and first tip and second tip used herein are intended to describe two different ends and two different tips to be joined using the contoured joining surfaces with self-alignment features of the present invention. The notations are not limiting and can be used in the reversed. For example, if a first end is said to have a male tip and a second end is said to have a corresponding female tip, then the scope of the invention is understood to cover a first end with a female tip and a second end with a male tip since such designations merely shifted the names of the parts and not the ideas behind them.

With reference now to FIGS. 16A-16D, schematic views of different wire ends 200, 202 of several different metal wire sections 220 to be joined end-to-end are shown, similar to the wire sections shown in FIGS. 10A-10C, 11A-11C, and 12A-12C.

With reference now to FIG. 16A, three different views of a metal wire section 220 having a first end 200 and a second end 202 are shown, including a side view, a cross-sectional view, and an end view. Thus, the two ends 200, 202 shown with reference to FIG. 16A can be ends of the same wire or ends of the same spring length having a spring body with a plurality of interconnected coils. The two ends 200, 202 have contoured shapes to facilitate spatial and/or radial alignments when placed together end-to-end to form a mated end set 206 to then form a weld joint 400 to permanently secure them together.

In the embodiment of FIG. 16A, the first end 200 can have a first tip 210a with a slot or female receiving end and the second end 202 can have a second tip 210b with a corresponding or counterpart male projection, similar to the arrangement of FIGS. 11A-11C. However, in the present embodiment, a shoulder 266 is provided around the male projection, or around the second tip 210b. Also, the female channel on the first tip 210 can be recessed from the outer edge 268 to form a blunt surface for abutting the shoulder 266, unlike the sharp edge of FIG. 11B.

The mated end set 206 of FIG. 16A has two ends 200, 202 that are in spatial alignment and/or radial alignment. That is, the complementary surfaces provide contact between the end surface 208 of the first end 200 and the end surface 216 of the second end to ensure spatial alignment and the female shape of the first tip 210a of the of the first end 200 receives the second tip 210b of the second end 200 and aligning the first end to the second end along the radial direction so that exterior surfaces 226 at the two ends are aligned and not offset to any noticeable amount. After the mated end set 206 is formed, the two ends 200, 202 can be welded to form a weld joint 400 to permanently secure the ends together to then form a closed loop ring or a spring ring.

In the embodiment of FIG. 16B, the first end 200 can have a first tip 210a with a slot or female receiving end and the second end 202 can have a second tip 210b with a corresponding male projection, similar to the arrangement of FIGS. 14A-14C. However, instead of being a ribbon, the metal wire section 220 of the present embodiment is a wire. The mating first and second tips 210a, 210b of the first and second ends 200, 202 for forming a mated end set 206 of the present embodiments can be considered a tongue and groove arrangement.

The mated end set 206 of FIG. 16B has two ends 200, 202 that are in spatial alignment and radial alignment. That is, the complementary surfaces provide contact between the end surface 208 of the first end 200 and the end surface 216 of the second end to ensure spatial alignment and the female shape of the first tip 210a of the of the first end 200 receives the second tip 210b of the second end 200 and aligning the first end to the second end along the radial direction so that exterior surfaces 226 at the two ends are aligned and not offset to any noticeable amount. After the mated end set 206 is formed, the two ends 200, 202 can be welded to form a weld joint 400 to permanently secure the ends together to then form a closed loop ring or a spring ring.

In the embodiment of FIG. 16C, the first end 200 can have a first tip 210a and the second end 202 can have a second tip 210b. The first tip 210a and the second tip 210b of the present embodiment can be identical but reversed, or identical reverse counterpart, to allow interlocking in the axial direction. Each tip can have a hook like structure with an extended part 270 having a structure extending axially of the body of the meal wire section 220 and a lip part 272 having a surface extending radially of the extended part. The mating first and second tips 210a, 210b of the first and second ends 200, 202 for forming a mated end set 206 of the present embodiment can be considered or called a tabled scarf joint.

The mated end set 206 of FIG. 16C has two ends 200, 202 that are in spatial alignment and/or radial alignment. That is, the complementary surfaces provide contacts between various surfaces of the tip to ensure spatial alignment and the similar but opposite hook like structures of the two tips engage to align the two tips in the radial direction so that exterior surfaces 226 at the two ends are aligned and not offset to any noticeable amount. After the mated end set 206 is formed, the two ends 200, 202 can be welded to form a weld joint 400 to permanently secure the ends together to then form a closed loop ring or a spring ring.

In the embodiment of FIG. 16D, the first end 200 can have a first tip 210a and the second end 202 can have a second tip 210b. The first tip 210a and the second tip 210b of the present embodiment can be identical but reversed, or identical reverse counterpart, to allow overlapping. Each tip can have an extended part 270 having a structure extending axially of the body of the meal wire section 220. The mating first and second tips 210a, 210b of the first and second ends 200, 202 for forming a mated end set 206 of the present embodiment can be considered or called a lapped scarf joint.

The mated end set 206 of FIG. 16D has two ends 200, 202 that are in spatial alignment and radial alignment. That is, the complementary surfaces provide contacts between various surfaces of the tip to ensure spatial alignment and the similar but opposite extended structures of the two tips engage to align the two tips in the radial direction so that exterior surfaces 226 at the two ends are aligned and not offset to any noticeable amount. After the mated end set 206 is formed, the two ends 200, 202 can be welded to form a weld joint 400 to permanently secure the ends together to then form a closed loop ring or a spring ring.

Figure 17:
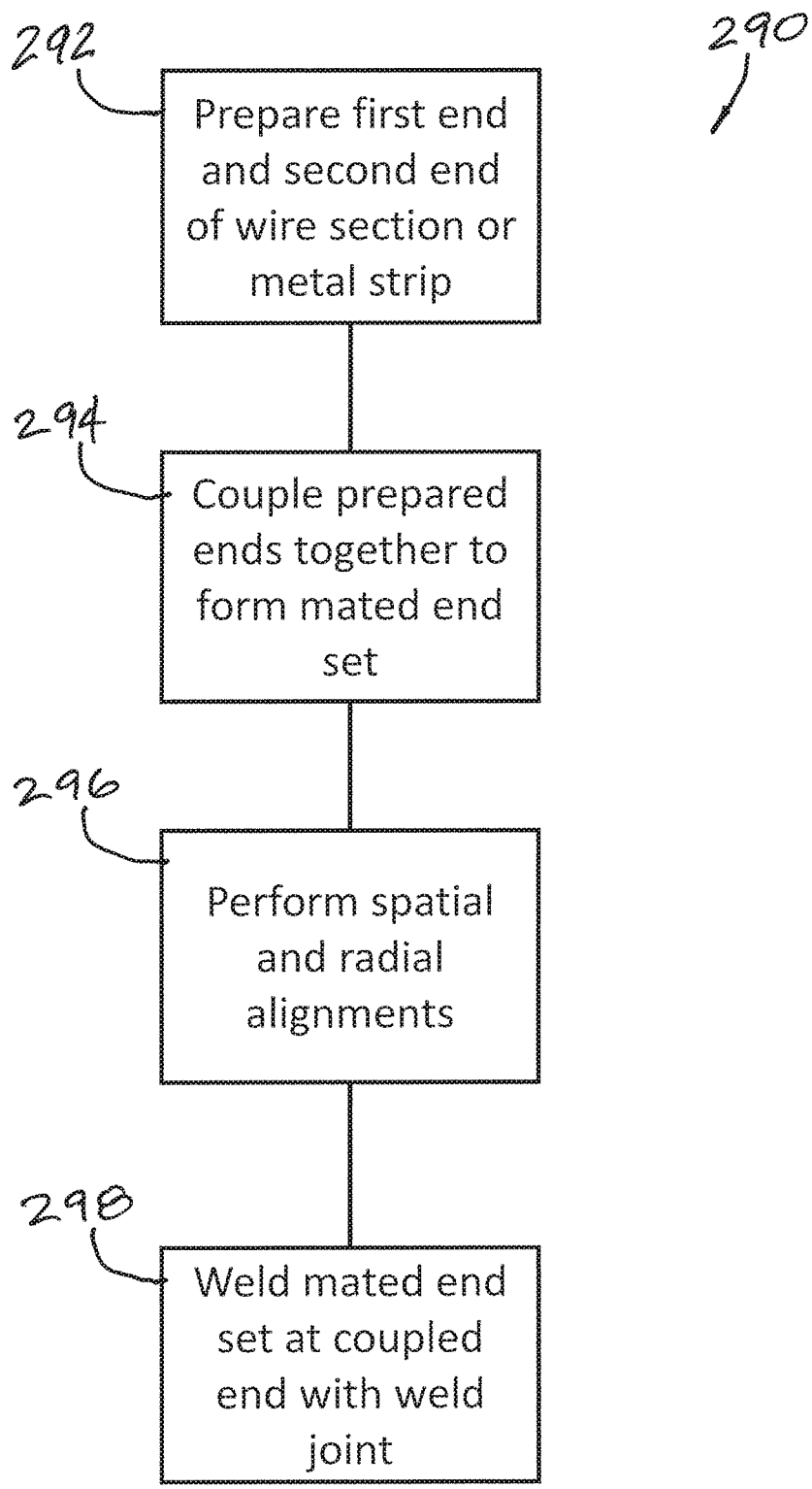
FIG. 17 is a process flow diagram depicting an exemplary manufacturing process.

With reference now to FIG. 17, a schematic flow diagram 290 depicting a process for forming a spring ring or a closed loop wire ring in accordance with aspects of the present invention is shown. The process starts by first obtaining a metal strip or a ribbon having two free ends or a metal wire section having two free ends at step 292.

The metal strip or ribbon can be a spring body with a plurality of ribbon coils or a spring body with a plurality of V-spring bodies each with two free ends and the metal wire section can be a wire with two free ends, or a coil spring length comprising a spring body with a plurality of interconnected coils with two free ends. In an example, the length with two free ends can be cut from a longer length or can be taken from a storage bin with pre-cut wire lengths or spring lengths waiting to be joined to form closed wire loops or spring rings. For purposes of the following discussions, the metal wire section and the metal strip or ribbon can be generically be referred to as a shaped metal length. The shaped metal length can be a metal wire section 220 described with reference to FIGS. 10A-12C and 16A-16D or a metal strip or ribbon 246 described with reference to FIGS. 13A-15C.

In an example, the two free ends, similar to first ends and second ends described elsewhere herein, can be processed to form surface features or contours on a first tip and a second tip before joining them end-to-end to form a mated end set. The surface features of the two free ends can have complementary surfaces with self-aligning features or are self-aligning. These self-aligning features on two counterpart ends can be similar to those shown with reference to FIGS. 10A-16D.

In an example, each of the two free ends are cold worked, such as by forging, wire coining, laser ablating, grinding, or combinations thereof to form a first tip on a first end and a second tip on a second end of a shaped metal length. In alternative embodiments, the ends can be shaped through a process called photo edging, which may be referred to as photo chemical milling, metal etching, chemical machining, or photo fabrication. The process can be used to form precision engineered photo etched metal parts. The process can be used on metal parts from about 0.0005-inch thick and up. Photo etching has been used in the hardware industries for many years and is preferred for eliminating the cost of hard tooling, improving design flexibility, and can eliminate burring and stress issues. In some examples, forging, wire coining, laser ablating, grinding, photo etching, or combinations thereof can be used to form the contours of the first and second tips with complementary surfaces of the first and second ends of the shaped metal length.

After the first tip of the first end and the second tip of the second end are formed, the two ends can be joined to form a mated end set and can be held in a jig in preparation for welding at step 294.

When the two shaped tips of a first end and a second end of a shaped metal length are joined, the two tips have complementary surfaces that can self-align the two ends both spatially and/or radially at step 296. As described with reference to FIGS. 10A-16D, the two ends self-align when merely moving them together end-to-end without external alignment tools. As previously described, this is understood to mean complementary surfaces on two different tips, such as a first tip and a complementary or corresponding second tip, that when brought together, the surfaces of the tips abut to align the tips spatially and/or radially, along at least one direction. The alignment can be automatically performed as the complementary surfaces can move the two tips into alignment when the two ends are merely brought together without additional or external alignment tools. Instead, the only tool needed after the alignment is in the form of a jig for holding the first end and the second end while the joined ends of the shaped metal length are positioned for welding. In alternative embodiments, no jig is used and the two joined ends are held by a technician during the welding process to form a weld joint.

After the ends of the shaped metal length are brought together at step 296, the joined ends are brought under a weld rig for welding and for forming a weld joint at step 298. In some examples, the weld rig can be a pulse arc welder, a resistive welder, or a laser welder. Less preferably, the weld rig can a soldering weld device. The weld can be performed at the interface of the first end and the second end.

The process 290 shown in FIG. 17 can repeat for a different shaped metal length to form another spring ring loop or closed wire loop.

Figure 18:
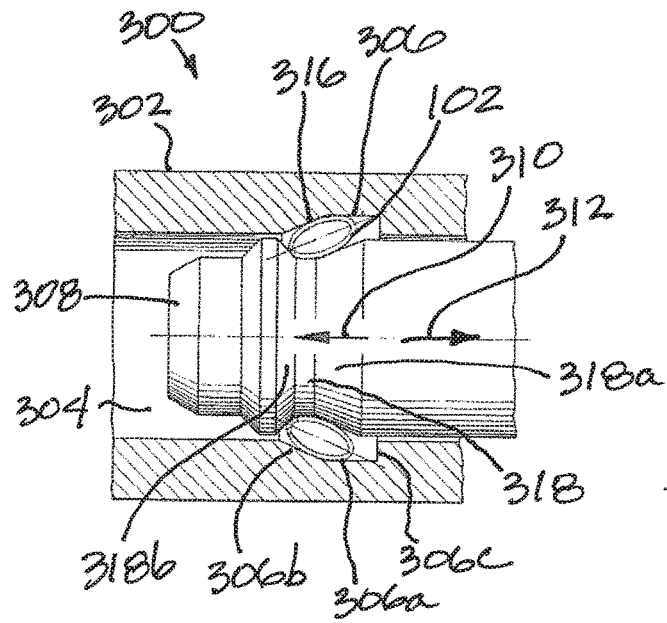
FIG. 18 is a partial cross-sectional side view of a locking connector that uses a spring ring in accordance with aspects of the invention.

With reference now to FIG. 18, an application using spring rings of the present invention is shown, which spring rings are each understood to include a weld joint formed after joining two ends of the spring together and wherein the ends have contoured surfaces, including complementary surfaces that self-align to facilitate welding. FIG. 18 shows a connector 300 that uses a canted coil spring having connected ends with complementary self-aligning tips of the present invention. The connector 300 has a housing 302 with a wall having an interior surface defining a bore 304 and a pin or piston 308, which can have a solid body throughout without a hollow core or a body with a hollow core, such as to permit fluid flow therethrough.

A groove 306 is formed with the housing inside the bore, which may be called a housing groove 306. The housing groove 306 has a bottom wall 306a, and two sidewalls 306b, 306c. As shown, sidewall 306c, which may be referred to as a load sidewall, is a right-angle wall, right angle relative to the lengthwise axis of the housing 302 and right angle to the bottom wall 306a. After the pin 308 is inserted into the bore by moving the pin in the first direction 310 and lifting the coils 102 with the tapered insertion end of the pin, the canted coil spring 316 is captured between the housing groove 306 and the pin groove 318, the pin is lock and cannot separate from the bore 304 when attempting to move in the second opposite direction 312. The canted coil spring can be a radial canted coil spring. Optionally, an axial canted coil spring can also be used.

The pin is lock to the housing as movement of the pin in the opposite second direction 312 moves the canted coil spring against the load sidewall 306c, which is configured and orientated to not permit compression of the canted coil spring. For example, the load sidewall 306c is positioned to contact the major axis of each coil 102 only, which does not cant the coil and therefore does not deflect the coils out of the way of the movement of the pin out of the bore. Thus, the pin 308 is locked from moving in the opposite direction of insertion to remove the pin from the housing.

Figure 21:
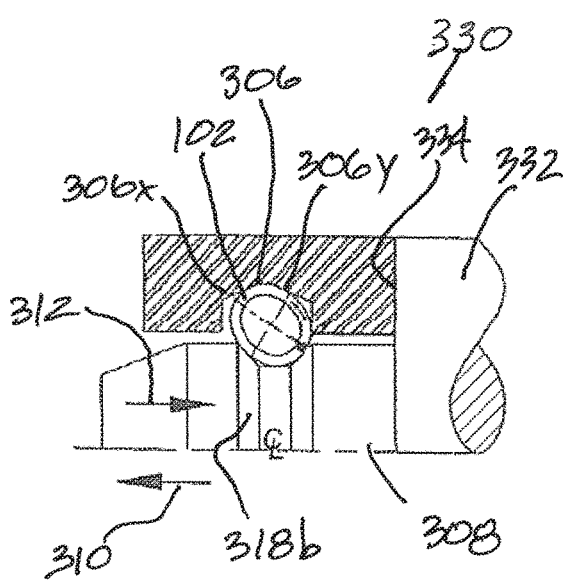
FIG. 21 shows a partial cross-sectional side view of another embodiment of a latching connector with unlatching that uses a spring ring in accordance with aspects of the invention.

However, when the pin 308, which may also be called a shaft or a piston, is further moved in the first direction 310, the tapered sidewall 306b, which may also be called a release sidewall, is configured and arranged to deflect the coils 102 of the canted coil spring 316. Deflection of the canted coil spring will move the coils out of the way of the movement of the pin out of the bore. In some examples, a shoulder is provided on the pin, which has an enlarged diameter that is larger than the nominal diameter of the pin, that will abut the end wall 302a of the housing 302 if the pin is further moved in the first direction 310. When the shoulder is incorporated, the pin 308 will be locked from moving in the opposite second direction 312, due to the load sidewall, as well as in the first direction 310, due to the shoulder located on the pin abutting the end wall of the housing. A shoulder on a pin is shown in FIG. 21.

The pin groove 318 has a V-shape with a subtended wall 318c located between two tapered surfaces 318a, 318b. In other examples, the V-shape pin groove does not have a subtended wall. As shown, the two tapered surfaces 318a, 318b of the V-shape groove is not symmetrical. In other words, one of the tapered sidewalls has a different slope than the other tapered sidewall. The two sidewalls can also have different wall lengths.

When the pin 308 is further pushed in the first direction 310 after being captured between the pin groove and the housing groove, the release sidewall 318a is arranged and configured to compress the coils along the minor axes of the coils 102 to move the coils out of the way of the movement of the pin.

Figure 19:
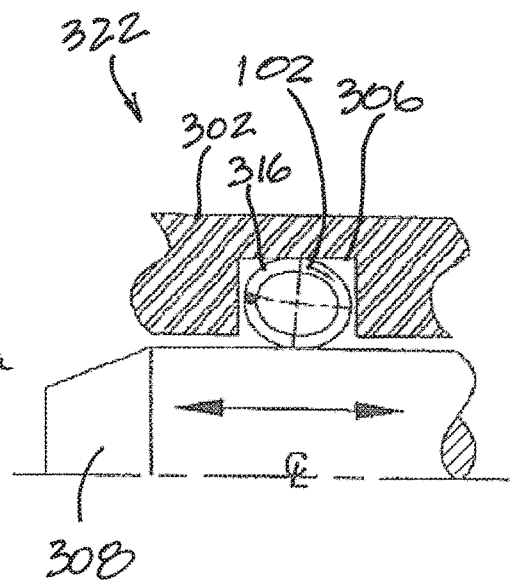
FIG. 19 is a partial cross-sectional side view of a holding connector that uses a spring ring in accordance with aspects of the invention.

FIG. 19 shows a partial cross-sectional view of a connector 322 comprising a housing 302, a pin 308, and a canted coil spring 316, which can have a weld joint for permanently securing two free ends of the spring ring together as provided herein. The free ends can each comprise a tip and wherein the two tips of the two free ends have complementary self-aligning surfaces as described elsewhere herein. The connector 322 of the present embodiment is known as a holding connector in that it incorporates a single groove only, either in the bore of the housing or on the exterior of the pin. As shown, the groove 306 is a housing groove. The housing groove 306 is shown with a bottom wall located between two generally parallel sidewalls. In other examples, the groove can have different configurations. For example, the housing groove can have a tapered bottom wall, one or both sidewalls can be tapered, either converging or diverging, or an insert can be located in the groove with shaped surfaces to turn the position of the coils 102, such as to rotate the major axis from the current parallel position relative to the lengthwise axis of the housing, to a rotated position.

A two headed arrow is shown with the pin 308. In a holding a connector, the holding force to secure the pin to the housing is provided by surface friction between the canted coil spring and the surface without the groove and the biasing force generated by the coils normal to the surface without the groove, which in the present embodiment is the pin. However, as the pin does not incorporate any groove with any load sidewall, the pin can slide out of the bore of the housing in either direction of the two headed arrow when the friction force is overcome.

The pin 308 can have a solid body with a tapered insertion end for lifting the coils 102 of the canted coil spring upon insertion of the pin into the bore of the housing. In other examples, the pin can have a hollow center, such as to accommodate a flow of fluid.

Figure 20:
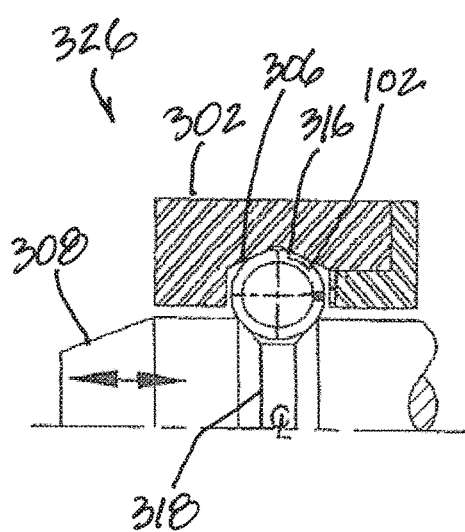
FIG. 20 is a partial cross-sectional side view of a latching connector with unlatching that uses a spring ring in accordance with aspects of the invention.

With reference now to FIG. 20, a further application of springs with ends having complementary self-aligning features is shown, which is in the form of a latching connector 326 having a housing 302 and a pin 308, which can have a solid body or a hollow body for fluid flow. The connector of FIG. 20 is shown as a partial cross-sectional view of a connector about a centerline. Generally speaking, a latching connector utilizes two grooves, one in the bore of the housing 302 and one on the exterior of the pin 308, similar to the locking connector of FIG. 18. However, unlike the locking connector, the pin can be inserted into the bore of the housing along a first direction and latched to the housing when the canted spring 316 is captured by the two grooves but can also unlatch or disconnect from the housing when the pin is reversed and moved in the opposite direction. Of course, the pin can also move in the same first direction to disconnect from the housing. The ability to latch and unlatch when moving in the opposite second direction is made possible by configuring the housing groove 306, the pin groove 318, or both grooves to have surfaces that can deflect the coils 102 at or near the minor axes of the coils during unlatching of the pin, when moving in the opposite direction of insertion, to enable the coils to move out of the way of the path of the pin to remove the pin from the housing. Thus, the geometries of the grooves for a latching/unlatching connector varies significantly with the geometries of the grooves for a locking connector.

As shown, the housing groove 306 has a V-bottom and the pin groove 318 has a V-groove with a subtended surface between the two slanted or tapered surfaces. However, the shapes of the housing groove and/or the pin groove can vary and can have other shapes or surfaces, such as a shallow groove with two parallel sidewalls or only a single tapered sidewall.

FIG. 21 shows yet another application of springs with ends having complementary self-aligning features, which is in the form of a latching connector 330 having a housing 302 and a pin 308, which can have a solid body or a hollow body for fluid flow. The connector of FIG. 20 is shown as a partial cross-sectional view of a connector about a centerline. The present latching with unlatching capability is similar to the latching connector of FIG. 20 with a few differences. In the present embodiment, the pin 308 is provided with an enlarged pin section 332 defining a shoulder 334. The shoulder 334 limits the depth of insertion of the pin 308 into the bore of the housing 302 when moving in the first direction 310 by abutting against an end surface of the housing 302 when latching the pin to the housing and capturing the canted coil spring between the housing groove and the pin groove.

In the latched configuration shown in FIG. 21, the major and the minor axes of the coils 102 have been turned so that the major axis is not parallel to the pin axis and the minor axis is not orthogonal to the pin axis. In this turned position, the minor axis of the coil 102 is biased against one of the tapered surfaces 318b of the pin groove 318 and one of the tapered surfaces 306y of the housing groove. This biasing configuration tends to push the pin further into the bore of the housing 302 against the constraint of the end surface of the housing against the shoulder 334 on the pin. Thus, the canted coil spring 316 is said to be preloaded in the latched state by exerting a spring force against the two tapered surfaces 318b, 306y.

The pin can separate from the housing when moving the pin in the second direction 312, opposite the first direction 310. During such movement, the coils 102 deflect or further cant in the same pre-canted direction to a further canting angle out of the way of the movement of the pin to enable the pin to separate from the housing.

As shown, the housing groove 306 has a V-bottom and the pin groove 318 has a V-groove with a subtended surface between the two slanted or tapered surfaces. However, the shapes of the housing groove and/or the pin groove can vary and can have other shapes or surfaces, such as a shallow groove with two parallel sidewalls or only a single tapered sidewall.

Figure 22:
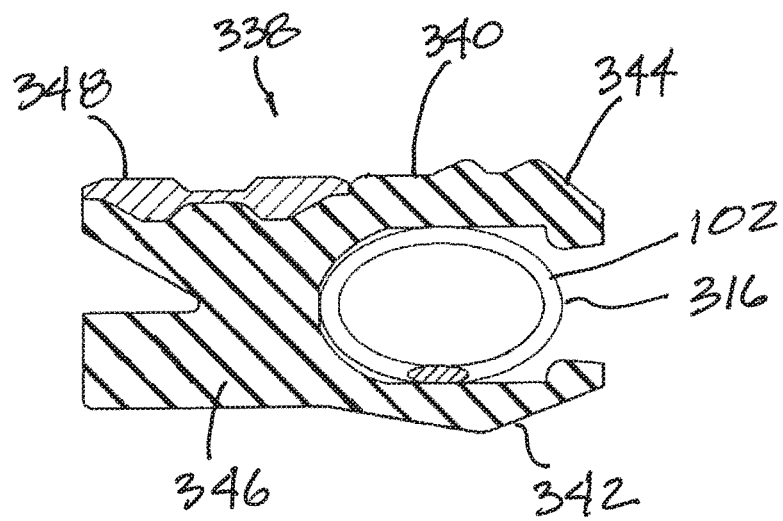
FIG. 22 is a partial cross-sectional view of a spring energized seal assembly that uses a spring ring in accordance with aspects of the invention.

With reference now to FIG. 22, another application of springs with ends having complementary self-aligning features is shown, which is in the form of a spring energized seal assembly 338. In the example shown, the seal assembly 338 has a seal element 340 with an inside flange 342 defining a bore for receiving and sealing against a shaft and an outside flange 344 defining an outside diameter for sealing against a gland or a housing, similar to that shown in FIG. 23. A center channel section 346 connects the inside and the outside flanges. The inside and outside flanges and the center channel section define a spring groove and is shown with a canted coil spring 316 located therein. The canted coil spring 316 can have a plurality of interconnected coils all turned generally along the same direction and wherein two ends of the canted coil spring ring 316 can have complementary self-aligning features as descried elsewhere herein. The canted coil spring 316 biases the inside flange and the outside flange away from one another to further press against surfaces to seal against.

A support ring 348 is provided around the outer perimeter of the center channel section 346. Complementary surfaces can be provided between the support ring and the center channel section to ensure alignment and fit. The support ring 348 wedge against an interior space of a housing to facilitate assembling the seal assembly 338 to the housing and to resist unwanted movement during service, such as unwanted rotation.

Figure 23:
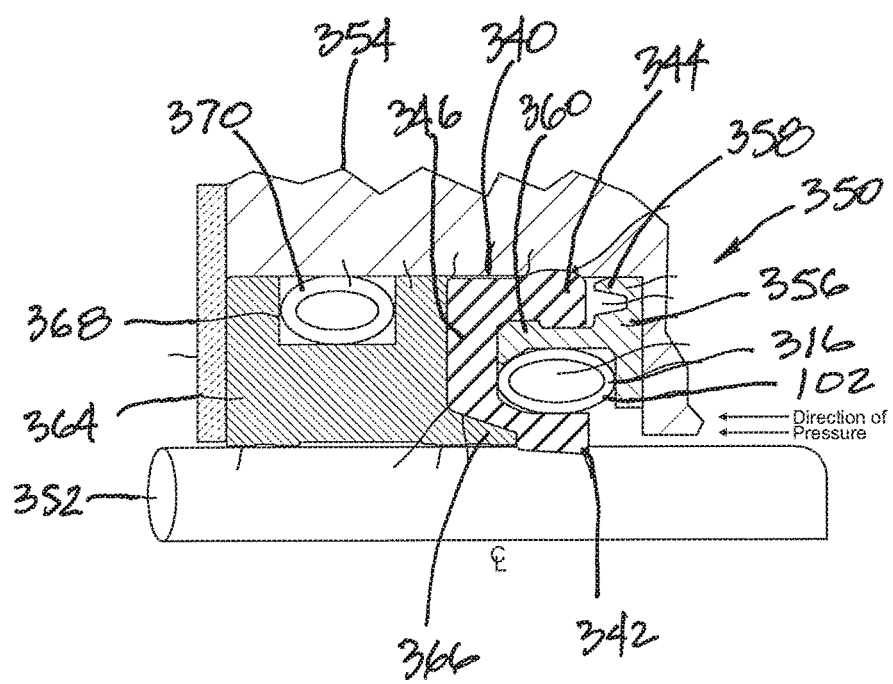
FIG. 23 is a partial cross-sectional view of another spring energized seal assembly that uses a spring ring in accordance with aspects of the invention.

With reference now to FIG. 23, a still further application of springs with ends having complementary self-aligning features is shown, which is in the form of another spring energized seal assembly 350. In the example shown, the seal assembly 350 has a seal element 340 with an inside flange 342 defining a bore for receiving and sealing against a shaft 352 and an outside flange 344 defining an outside diameter for sealing against a gland or a housing 354. A center channel section 346 connects the inside and the outside flanges. The inside and outside flanges and the center channel section define a spring groove and is shown with a canted coil spring 316 located therein. The canted coil spring 316 can have a plurality of interconnected coils all turned generally along the same direction and wherein two ends of the canted coil spring ring 316 can have complementary self-aligning features as described elsewhere herein. The canted coil spring 316 biases the inside flange and the outside flange away from one another to further press against the housing and the shaft to facilitate sealing.

A locking ring 356 with a leaf spring 358 is provided with the seal assembly. The leaf spring is configured to bias the locking ring 356 against the housing to secure the seal assembly to the housing, such as to prevent unwanted rotation of the seal element during service. The locking ring has a flange 360 that extends into the spring cavity of the seal element and together with the seal element defines a spring groove that the coils 102 bias against.

A backup ring 364 is provided for backing the seal element against service pressure that tends to push the seal element in the direction of low pressure. For relatively high-pressure applications, the backup ring 364 can support the seal element from extrusion caused by differential pressures between service pressure and pressure downstream or external of the seal assembly. The backup ring 364 has a support foot 366 that extends into a void between the center channel section 346 and the inside flange 342 of the seal element to further support the sealing lip of the inside flange.

To center the backup ring 364 within the bore of the housing 354, a groove 368 is provided with the body of the backup ring with a spring ring 370 positioned in the groove 368. The spring ring 370 can be a canted coil spring as shown with ends having complementary self-aligning features as described herein. Alternatively, the spring in the groove of the backup ring can be a V-spring or a ribbon spring with ends having complementary self-aligning features as described herein.

The spring rings and closed wire loops described herein may be used with other connectors and seal assemblies. For example, the disclosed springs may be used with a face seal element and with locking connectors having different groove configurations than shown.

Methods of making and of using spring rings and closed wire loops and their applications, such as in a connector or a sealing application, are within the scope of the present invention. The present concept can be used to joint two lengths or two spring lengths together or where a weld is required for two free ends, and not necessarily restricted to a single length to form a closed loop.

Although limited embodiments of spring rings and closed wire loops and their applications in connectors and seal assemblies and their components have been specifically described and illustrated herein, many modifications and variations will be apparent to those skilled in the art. For example, the various spring rings may incorporate different shapes, materials, sizes, etc. Furthermore, it is understood and contemplated that features specifically discussed for one spring, connector, or seal assembly embodiment may be adopted for inclusion in embodiments, provided the functions are compatible. Accordingly, it is to be understood that the spring rings and closed wire loops and their applications, such as in a connector or a sealing application and their components constructed according to principles of the disclosed devices, systems, and methods may be embodied other than as specifically described herein. The disclosure is also defined in the following claims.

What is claimed is:

1. A metallic spring ring comprising:
   a spring length having a spring body made from a metal wire with a plurality of interconnected coils or interconnected V-bodies with gaps between adjacent V-bodies, said spring body having a first end connected to a second end to form a closed loop, said second end being on an end of the spring body opposite the first end;
   wherein the first end comprises a male tip having a tip most point and an exterior surface and the second end comprises a female receiving end having an exterior surface and a bottom most point to receive the tip most point of the male tip;
   wherein the male tip and the female receiving end have complementary surfaces for aligning the two ends along a first direction and along at least one radial direction relative to the first direction; and
   wherein the tip most point of the male tip and the bottom most point of the female receiving end are spaced from a weld joint formed at the exterior surface of the male tip and the exterior surface of the female receiving end.

2. The metallic spring ring of claim 1, wherein the metal wire is a multi-metallic wire.

3. The metallic spring ring of claim 1, wherein the complementary surfaces comprises an abutting surface on the male tip contacting an abutting surface on the female receiving end.

4. The metallic spring ring of claim 1, wherein the complementary surfaces of the male tip and the female receiving end are self-aligning.

5. The metallic spring ring of claim 1, wherein the complementary surfaces are at least one of a cone and a counterpart female receiving end, a flat tip with depending surfaces and a counterpart female receiving end, a tongue and a groove, a dovetail and a counterpart female receiving end, an extended portion with a radial portion and an identical reverse counterpart, and an extended portion and an identical reverse counterpart.

6. The metallic spring ring of claim 2, wherein the plurality of interconnected coils cant generally in a same direction or are helical coils.

7. The metallic spring ring of claim 2, wherein the metal wire is round.

8. The metallic spring ring of claim 2, wherein the V-bodies each comprises a first leg attached to a second leg at a connecting end.

9. The metallic spring ring of claim 1, wherein the tip most point contact the bottom most point.

10. A connector assembly comprising:
 a housing having a bore;
 a pin located inside the bore of the housing;
 at least one groove formed with the housing inside the bore or on an exterior of the pin;
 a spring ring located in the at least one groove; wherein the spring ring comprising:
 a spring length having a spring body made from a metal wire with a plurality of interconnected coils or interconnected V-bodies with gaps between adjacent V-bodies, said spring body having a first end connected to a second end to form a closed loop, said second end being on an end of the spring body opposite the first end;
 wherein the first end comprises a male tip having a tip most point and an exterior surface and the second end comprises a female receiving end having an exterior surface and a bottom most point to receive the tip most point of the male tip;
 wherein the male tip and the female receiving end have complementary surfaces for aligning the two ends along a first direction and along at least one radial direction relative to the first direction; and
 wherein the tip most point of the male tip and the bottom most point of the female receiving end are spaced from a weld joint formed at the exterior surface of the male tip and the exterior surface of the female receiving end.

11. The connector assembly of claim 10, further comprising a second groove, and wherein the spring ring is captured between the at least one groove and the second groove.

12. The connector assembly of claim 10, wherein the spring ring is a radial canted coil spring or an axial canted coil spring.

13. The connector assembly of claim 10, wherein the metal wire is a rounded metal wire.

14. The connector assembly of claim 10, wherein the complementary surfaces are at least one of a cone and a counterpart female receiving end, a flat tip with depending surfaces and a counterpart female receiving end, a tongue and a groove, a dovetail and a counterpart female receiving end, an extended portion with a radial portion and an identical reverse counterpart, and an extended portion and an identical reverse counterpart.

15. The connector assembly of claim 10, wherein the plurality of interconnected coils cant generally in a same direction or are helical coils.

16. The connector assembly of claim 10, wherein the V-bodies each comprises a first leg attached to a second leg at a connecting end.

17. A seal assembly comprising:
 a seal element having an inside flange defining a bore, an outside flange defining an outside diameter of the seal element, and a center channel section, said inside and outside flanges and said center channel, section defining a spring, groove; and
 a spring ring located in the spring groove, said spring ring comprising:
 a spring length having a spring body made from a metal wire with a plurality of interconnected coils or interconnected V-bodies with gaps between adjacent V-bodies, said spring body having a first end connected to a second end to form a closed loop, said second end being on an end of the spring body opposite the first end;
 wherein the first end comprises a male tip having a tip most point and an exterior surface and the second end comprises a female receiving end having an exterior surface and a bottom most point to receive the tip most point of the male tip;
 wherein the male tip and the female receiving end have complementary surfaces for aligning the two ends along a first direction and along at least one radial direction relative to the first direction; and
 wherein the tip most point of the male tip and the bottom most point of the female receiving end are spaced from a weld joint formed at the exterior surface of the male tip and the exterior surface of the female receiving end.

18. The seal assembly of claim 17, further comprising a support ring engaged to the center channel section or a locking ring having a flange extending into the spring groove.

19. The seal assembly of claim 17, further comprising a support ring abutting the seal element.

20. The seal assembly of claim 17, wherein the complementary surfaces are at least one of a cone and a counterpart female receiving end, a flat tip with depending surfaces and a counterpart female receiving end, a tongue and a groove, a dovetail and a counterpart female receiving end, an extended portion with a radial portion and an identical reverse counterpart, and an extended portion and an identical reverse counterpart.

* * * * *